(12) United States Patent
Quigley et al.

(10) Patent No.: US 8,763,647 B2
(45) Date of Patent: Jul. 1, 2014

(54) COMPOSITE TUBING

(75) Inventors: Peter A. Quigley, Duxbury, MA (US);
Stephen C. Nolet, Franklin, MA (US);
Thomas W. Wideman, Milton, MA (US); Michael Feechan, Katy, TX (US)

(73) Assignee: Fiberspar Corporation, New Bedford, MA (US)

( * ) Notice: Subject to any disclaimer, the term of this patent is extended or adjusted under 35 U.S.C. 154(b) by 151 days.

(21) Appl. No.: 12/472,893

(22) Filed: May 27, 2009

(65) Prior Publication Data
US 2010/0101676 A1 Apr. 29, 2010

Related U.S. Application Data

(63) Continuation of application No. 11/543,300, filed on Oct. 4, 2006, now abandoned, which is a continuation of application No. 10/134,971, filed on Apr. 29, 2002, now abandoned.

(60) Provisional application No. 60/287,268, filed on Apr. 27, 2001, provisional application No. 60/287,193, filed on Apr. 27, 2001, provisional application No. 60/337,848, filed on Nov. 5, 2001, provisional application No. 60/337,025, filed on Dec. 3, 2001.

(51) Int. Cl.
*F16L 11/00* (2006.01)

(52) U.S. Cl.
USPC ......... 138/137; 138/143; 138/149; 428/36.91

(58) Field of Classification Search
USPC ........ 138/138, 141, 143, 149, 137; 428/36.91
See application file for complete search history.

(56) References Cited

U.S. PATENT DOCUMENTS

| 87,993 A | 3/1869 | Weston |
| 396,176 A | 1/1889 | Simpson |
| 418,906 A | 1/1890 | Bosworth |
| 482,181 A | 9/1892 | Kellom |
| 646,887 A | 4/1900 | Stowe et al. ............. 174/47 |
| 749,633 A | 1/1904 | Seeley |
| 1,234,812 A | 7/1917 | Simmmons |

(Continued)

FOREIGN PATENT DOCUMENTS

| BE | 559688 | 8/1957 |
| CH | 461199 | 8/1968 |

(Continued)

OTHER PUBLICATIONS

International Search Report Completed on Aug. 5, 2002.

(Continued)

*Primary Examiner* — James Hook
(74) *Attorney, Agent, or Firm* — Goodwin Procter LLP

(57) ABSTRACT

The present disclosure is directed to embodiments of composite tubing having properties tailored to meet a wide variety of environmental and working conditions. Composite tubes disclosed herein may include one or more of the following layers: a internal liner, a composite layer, a thermal insulation layer, a crush resistant layer, a permeation barrier, buoyancy control layer, a pressure barrier layer, and a wear resistant layer. Grooves may be provided in one or more layers of the composite tube to provide increased axial permeability to the composite tube. A venting system, including vent paths, may be provided in the composite tube to vent fluid that may become trapped within the wall of the composite tube.

15 Claims, 8 Drawing Sheets

(56) References Cited

U.S. PATENT DOCUMENTS

| | | | |
|---|---|---|---|
| 1,793,455 A | 2/1931 | Buchanan | |
| 1,890,290 A | 12/1932 | Hargreaves | |
| 1,930,285 A | 10/1933 | Robinson | 138/143 |
| 2,464,416 A | 3/1949 | Raybould | |
| 2,467,520 A | 4/1949 | Brubaker | |
| 2,481,001 A | 9/1949 | Burckle | |
| 2,624,366 A * | 1/1953 | Pugh | 138/115 |
| 2,648,720 A | 8/1953 | Alexander | 174/34 |
| 2,690,769 A | 10/1954 | Brown | 138/55 |
| 2,725,713 A | 12/1955 | Blanchard | 57/149 |
| 2,742,931 A * | 4/1956 | De Ganahl | 138/144 |
| 2,750,569 A | 6/1956 | Moon | |
| 2,810,424 A | 10/1957 | Swartswelter et al. | 154/1.8 |
| 2,969,812 A * | 1/1961 | De Ganahl | 285/238 |
| 2,973,975 A | 3/1961 | Ramberg et al. | |
| 2,991,093 A | 7/1961 | Guarnaschelli | |
| 3,086,369 A | 4/1963 | Brown | |
| 3,116,760 A | 1/1964 | Matthews | 138/125 |
| 3,170,137 A | 2/1965 | Brandt | |
| 3,277,231 A | 10/1966 | Downey et al. | 174/47 |
| 3,306,637 A | 2/1967 | Press et al. | |
| 3,334,663 A | 8/1967 | Peterson | 138/132 |
| 3,354,992 A | 11/1967 | Cook et al. | |
| 3,379,220 A | 4/1968 | Kiuchi et al. | 138/125 |
| 3,390,704 A | 7/1968 | Woodell | |
| 3,413,169 A | 11/1968 | Krings et al. | |
| 3,459,229 A | 8/1969 | Croft | |
| 3,477,474 A | 11/1969 | Mesler | 138/133 |
| 3,507,412 A | 4/1970 | Carter | 214/338 |
| 3,522,413 A | 8/1970 | Chrow | 219/301 |
| 3,554,284 A | 1/1971 | Nystrom | 166/250 |
| 3,563,825 A * | 2/1971 | Segura | 156/187 |
| 3,579,402 A | 5/1971 | Goldswohy et al. | 156/392 |
| 3,589,135 A | 6/1971 | Ede | |
| 3,589,752 A | 6/1971 | Spencer et al. | |
| 3,604,461 A | 9/1971 | Matthews | 138/137 |
| 3,606,396 A | 9/1971 | Prosdocimo et al. | |
| 3,606,402 A | 9/1971 | Medney | 285/305 |
| 3,677,978 A | 7/1972 | Dowbenko et al. | |
| 3,685,860 A | 8/1972 | Schmidt | |
| 3,692,601 A | 9/1972 | Goldsworthy et al. | 156/74 |
| 3,696,332 A | 10/1972 | Dickson, Jr. et al. | |
| 3,700,519 A | 10/1972 | Carter | 156/156 |
| 3,701,489 A | 10/1972 | Goldsworthy et al. | 242/7.21 |
| 3,728,187 A | 4/1973 | Martin | |
| 3,730,229 A | 5/1973 | D'Onofrio | |
| 3,734,421 A | 5/1973 | Karlson et al. | 242/7.21 |
| 3,738,637 A | 6/1973 | Goldsworthy et al. | 269/61 |
| 3,740,285 A | 6/1973 | Goldsworthy et al. | 159/173 |
| 3,744,016 A | 7/1973 | Davis | |
| 3,769,127 A | 10/1973 | Goldsworthy et al. | 156/172 |
| 3,773,090 A | 11/1973 | Ghersa et al. | |
| 3,776,805 A | 12/1973 | Hansen | |
| 3,783,060 A | 1/1974 | Goldsworthy et al. | 156/69 |
| 3,814,138 A | 6/1974 | Courtot | |
| 3,817,288 A | 6/1974 | Ball | |
| 3,828,112 A | 8/1974 | Johansen et al. | 174/47 |
| 3,856,052 A | 12/1974 | Feucht | |
| 3,860,040 A | 1/1975 | Sullivan | |
| 3,860,742 A | 1/1975 | Medney | 174/84 S |
| 3,901,281 A | 8/1975 | Morrisey | |
| 3,907,335 A | 9/1975 | Burge et al. | |
| 3,913,624 A | 10/1975 | Ball | |
| 3,933,180 A | 1/1976 | Carter | 138/89 |
| 3,955,601 A * | 5/1976 | Plummer, III | 138/149 |
| 3,956,051 A | 5/1976 | Carter | 156/429 |
| 3,957,410 A | 5/1976 | Goldsworthy et al. | 425/183 |
| 3,960,629 A | 6/1976 | Goldsworthy | 156/180 |
| 3,974,862 A | 8/1976 | Fuhrmann et al. | |
| 3,980,325 A | 9/1976 | Robertson | |
| RE29,112 E | 1/1977 | Carter | 156/156 |
| 4,013,101 A * | 3/1977 | Logan et al. | 138/130 |
| 4,032,177 A | 6/1977 | Anderson | |
| 4,048,807 A | 9/1977 | Ellers et al. | |
| 4,053,343 A | 10/1977 | Carter | 156/172 |
| 4,057,610 A | 11/1977 | Goettler et al. | 264/108 |
| 4,095,865 A | 6/1978 | Denison et al. | 339/16 R |
| 4,108,701 A | 8/1978 | Stanley | 156/160 |
| 4,111,469 A | 9/1978 | Kavick | |
| 4,114,393 A | 9/1978 | Engle, Jr. et al. | |
| 4,125,423 A | 11/1978 | Goldsworthy | 156/428 |
| 4,133,972 A | 1/1979 | Andersson et al. | 174/47 |
| 4,137,949 A | 2/1979 | Linko, III et al. | 138/125 |
| 4,139,025 A | 2/1979 | Carlstrom | 138/153 |
| 4,190,088 A | 2/1980 | Lalikos et al. | 138/126 |
| 4,200,126 A | 4/1980 | Fish | 138/143 |
| 4,220,381 A | 9/1980 | van der Graaf | 339/16 C |
| 4,226,446 A | 10/1980 | Burrington | |
| 4,241,763 A | 12/1980 | Antal et al. | 138/127 |
| 4,248,062 A | 2/1981 | McLain et al. | 64/1 |
| 4,261,390 A | 4/1981 | Belofsky | 138/125 |
| 4,273,160 A | 6/1981 | Lowles | |
| 4,303,263 A | 12/1981 | Legris | |
| 4,303,457 A | 12/1981 | Johansen et al. | 156/149 |
| 4,306,591 A | 12/1981 | Arterburn | |
| 4,307,756 A * | 12/1981 | Voigt et al. | 138/149 |
| 4,308,999 A | 1/1982 | Carter | 242/7.02 |
| 4,336,415 A | 6/1982 | Walling | 174/47 |
| 4,351,364 A | 9/1982 | Cocks et al. | |
| 4,380,252 A | 4/1983 | Gray et al. | |
| 4,402,346 A | 9/1983 | Cheetham et al. | |
| 4,417,603 A * | 11/1983 | Argy | 138/149 |
| 4,421,806 A | 12/1983 | Marks et al. | |
| 4,422,801 A | 12/1983 | Hale et al. | |
| 4,445,734 A | 5/1984 | Cunningham | |
| 4,446,892 A | 5/1984 | Maxwell | 138/104 |
| 4,447,378 A * | 5/1984 | Gray et al. | 264/45.9 |
| 4,463,779 A | 8/1984 | Wink et al. | 138/125 |
| 4,488,577 A | 12/1984 | Shilad et al. | |
| 4,507,019 A | 3/1985 | Thompson | |
| 4,515,737 A | 5/1985 | Karino et al. | 264/22 |
| 4,522,058 A | 6/1985 | Ewing | |
| 4,522,235 A | 6/1985 | Kluss et al. | 138/130 |
| 4,530,379 A | 7/1985 | Policelli | 138/109 |
| 4,556,340 A | 12/1985 | Morton | 405/193 |
| 4,567,916 A | 2/1986 | Antal et al. | |
| 4,578,675 A | 3/1986 | MacLeod | 340/855 |
| 4,606,378 A | 8/1986 | Meyer | |
| 4,627,472 A | 12/1986 | Goettler et al. | 138/174 |
| 4,657,795 A | 4/1987 | Foret | 428/36 |
| 4,681,169 A | 7/1987 | Brookbank, III | 166/385 |
| 4,700,751 A | 10/1987 | Fedrick | |
| 4,706,711 A * | 11/1987 | Czvikovszky et al. | 138/103 |
| 4,712,813 A | 12/1987 | Passerell et al. | |
| 4,728,224 A | 3/1988 | Salama et al. | 405/195 |
| 4,729,106 A | 3/1988 | Rush et al. | |
| 4,741,795 A | 5/1988 | Grace et al. | |
| 4,758,455 A | 7/1988 | Campbell et al. | |
| 4,789,007 A | 12/1988 | Cretel | 138/174 |
| 4,842,024 A | 6/1989 | Palinchak | |
| 4,844,516 A | 7/1989 | Baker | |
| 4,849,668 A | 7/1989 | Crawley et al. | 310/328 |
| 4,859,024 A | 8/1989 | Rahman | 350/96.23 |
| 4,903,735 A | 2/1990 | Delacour et al. | |
| 4,913,657 A | 4/1990 | Naito et al. | |
| 4,936,618 A | 6/1990 | Sampa et al. | |
| 4,941,774 A | 7/1990 | Harmstorf et al. | |
| 4,942,903 A | 7/1990 | Jacobsen et al. | |
| 4,972,880 A | 11/1990 | Strand | |
| 4,992,787 A | 2/1991 | Helm | 340/854 |
| 4,995,761 A | 2/1991 | Barton | |
| 5,024,252 A * | 6/1991 | Ochsner | 138/130 |
| 5,048,572 A | 9/1991 | Levine | |
| 5,072,622 A | 12/1991 | Roach et al. | |
| 5,077,107 A | 12/1991 | Kaneda et al. | |
| 5,090,741 A | 2/1992 | Yokomatsu et al. | |
| 5,097,870 A | 3/1992 | Williams | 138/115 |
| 5,156,206 A | 10/1992 | Cox | |
| 5,170,011 A | 12/1992 | Martucci | 174/47 |
| 5,172,765 A | 12/1992 | Sas-Jaworsky et al. | 166/384 |
| 5,176,180 A | 1/1993 | Williams et al. | 138/172 |
| 5,182,779 A | 1/1993 | D'Agostino et al. | 385/13 |
| 5,184,682 A | 2/1993 | Delacour et al. | 166/385 |
| 5,188,872 A | 2/1993 | Quigley | 428/36.2 |

(56) References Cited

U.S. PATENT DOCUMENTS

| | | | |
|---|---|---|---|
| 5,209,136 A | 5/1993 | Williams | 74/502.5 |
| 5,222,769 A | 6/1993 | Kaempen | 285/45 |
| 5,261,462 A | 11/1993 | Wolfe et al. | |
| 5,265,648 A | 11/1993 | Lyon | |
| 5,285,008 A | 2/1994 | Sas-Jaworsky et al. | 174/47 |
| 5,285,204 A | 2/1994 | Sas-Jaworsky | 340/854.9 |
| 5,330,807 A | 7/1994 | Williams | 428/34.5 |
| 5,332,269 A | 7/1994 | Homm | |
| 5,334,801 A | 8/1994 | Mohn | 174/47 |
| 5,343,738 A | 9/1994 | Skaggs | |
| 5,346,658 A | 9/1994 | Gargiulo | |
| 5,348,088 A | 9/1994 | Laflin et al. | |
| 5,348,096 A | 9/1994 | Williams | 166/384 |
| 5,351,752 A | 10/1994 | Wood et al. | 166/68 |
| RE34,780 E | 11/1994 | Trenconsky et al. | |
| 5,364,130 A | 11/1994 | Thalmann | |
| 5,394,488 A | 2/1995 | Fernald et al. | 385/13 |
| 5,395,913 A | 3/1995 | Bottcher et al. | |
| 5,398,729 A | 3/1995 | Spurgat | |
| 5,400,602 A * | 3/1995 | Chang et al. | 62/50.7 |
| 5,416,724 A | 5/1995 | Savic | |
| 5,426,297 A | 6/1995 | Dunphy et al. | 250/227.23 |
| 5,428,706 A | 6/1995 | Lequeux | 392/472 |
| 5,435,867 A | 7/1995 | Wolfe et al. | 156/171 |
| 5,437,311 A | 8/1995 | Reynolds | |
| 5,443,099 A | 8/1995 | Chaussepied et al. | 138/109 |
| 5,452,923 A | 9/1995 | Smith | |
| 5,457,899 A | 10/1995 | Chemello | |
| RE35,081 E | 11/1995 | Quigley | 428/36.2 |
| 5,469,916 A | 11/1995 | Sas-Jaworsky et al. | 166/64 |
| 5,472,764 A | 12/1995 | Kehr et al. | |
| 5,494,374 A * | 2/1996 | Youngs et al. | 405/52 |
| 5,499,661 A | 3/1996 | Odru et al. | 138/124 |
| 5,524,937 A | 6/1996 | Sides, III et al. | |
| 5,525,698 A | 6/1996 | Bottcher et al. | |
| 5,538,513 A | 7/1996 | Okajima et al. | |
| 5,551,484 A | 9/1996 | Charboneau | 138/104 |
| 5,558,375 A | 9/1996 | Newman | |
| 5,622,211 A | 4/1997 | Martin et al. | |
| 5,641,956 A | 6/1997 | Vengsarkar et al. | 250/227.14 |
| 5,671,811 A | 9/1997 | Head | |
| 5,683,204 A | 11/1997 | Lawther | |
| 5,692,545 A | 12/1997 | Rodrigue | |
| 5,718,956 A * | 2/1998 | Gladfelter et al. | 428/35.9 |
| 5,730,188 A | 3/1998 | Kalman et al. | 138/135 |
| 5,755,266 A | 5/1998 | Aanonsen et al. | 138/174 |
| 5,758,990 A | 6/1998 | Davies et al. | |
| 5,778,938 A | 7/1998 | Chick et al. | |
| 5,785,091 A * | 7/1998 | Barker, II | 138/123 |
| 5,795,102 A | 8/1998 | Corbishley | |
| 5,797,702 A | 8/1998 | Drost et al. | |
| 5,798,155 A | 8/1998 | Yanagawa et al. | |
| 5,804,268 A | 9/1998 | Mukawa et al. | |
| 5,828,003 A | 10/1998 | Thomeer et al. | 174/69 |
| 5,865,216 A * | 2/1999 | Youngs | 138/135 |
| 5,875,792 A | 3/1999 | Campbell, Jr. et al. | |
| 5,908,049 A | 6/1999 | Williams et al. | 138/125 |
| 5,913,337 A | 6/1999 | Williams et al. | 138/125 |
| 5,921,285 A | 7/1999 | Quigley et al. | 138/125 |
| 5,933,945 A | 8/1999 | Thomeer et al. | 29/825 |
| 5,950,651 A | 9/1999 | Kenworthy et al. | |
| 5,951,812 A | 9/1999 | Gilchrist, Jr. | 156/304.2 |
| 5,979,506 A | 11/1999 | Aarseth | |
| 5,984,581 A | 11/1999 | McGill et al. | |
| 5,988,702 A | 11/1999 | Sas-Jaworsky | |
| 6,004,639 A | 12/1999 | Quigley et al. | 428/36.3 |
| 6,016,845 A | 1/2000 | Quigley et al. | 138/125 |
| 6,032,699 A | 3/2000 | Cochran et al. | |
| 6,066,377 A | 5/2000 | Tonyali et al. | |
| 6,076,561 A * | 6/2000 | Akedo et al. | 138/149 |
| 6,093,752 A | 7/2000 | Park et al. | |
| 6,123,110 A | 9/2000 | Smith et al. | |
| 6,136,216 A | 10/2000 | Fidler et al. | |
| 6,148,866 A | 11/2000 | Quigley et al. | 138/125 |
| RE37,109 E | 3/2001 | Ganelin | |
| 6,209,587 B1 | 4/2001 | Hsich et al. | 138/137 |
| 6,220,079 B1 | 4/2001 | Taylor et al. | |
| 6,286,558 B1 | 9/2001 | Quigley et al. | 138/125 |
| 6,315,002 B1 | 11/2001 | Antal et al. | |
| 6,328,075 B1 | 12/2001 | Furuta et al. | |
| 6,334,466 B1 | 1/2002 | Jani et al. | |
| 6,357,485 B2 | 3/2002 | Quigley et al. | |
| 6,357,966 B1 | 3/2002 | Thompson | |
| 6,361,299 B1 | 3/2002 | Quigley et al. | 425/35.9 |
| 6,372,861 B1 | 4/2002 | Schillgalies et al. | |
| 6,390,140 B2 | 5/2002 | Niki et al. | |
| 6,397,895 B1 * | 6/2002 | Lively | 138/146 |
| 6,402,430 B1 | 6/2002 | Guesnon | |
| 6,422,269 B1 | 7/2002 | Johansson et al. | |
| 6,461,079 B1 | 10/2002 | Beaujean | |
| 6,470,915 B1 | 10/2002 | Enders et al. | |
| 6,532,994 B1 | 3/2003 | Enders et al. | |
| 6,538,198 B1 | 3/2003 | Wooters | |
| 6,604,550 B2 | 8/2003 | Quigley et al. | |
| 6,620,475 B1 | 9/2003 | Reynolds, Jr. et al. | |
| 6,631,743 B2 | 10/2003 | Enders et al. | |
| 6,634,387 B1 | 10/2003 | Glejbøl et al. | |
| 6,634,388 B1 | 10/2003 | Taylor et al. | |
| 6,663,453 B2 | 12/2003 | Quigley et al. | |
| 6,706,348 B2 | 3/2004 | Quigley et al. | |
| 6,746,737 B2 | 6/2004 | Debalme et al. | |
| 6,764,365 B2 | 7/2004 | Quigley et al. | |
| 6,787,207 B2 | 9/2004 | Lindstrom et al. | |
| 6,803,082 B2 | 10/2004 | Nichols et al. | |
| 6,807,989 B2 | 10/2004 | Enders et al. | |
| 6,857,452 B2 | 2/2005 | Quigley et al. | |
| 6,902,205 B2 | 6/2005 | Bouey et al. | |
| 6,978,804 B2 | 12/2005 | Quigley et al. | |
| 6,983,766 B2 | 1/2006 | Baron et al. | |
| 7,000,644 B2 | 2/2006 | Ichimura et al. | |
| 7,025,580 B2 | 4/2006 | Heagy et al. | |
| 7,029,356 B2 | 4/2006 | Quigley et al. | |
| 7,069,956 B1 | 7/2006 | Mosier | |
| 7,080,667 B2 | 7/2006 | McIntyre et al. | |
| 7,152,632 B2 | 12/2006 | Quigley et al. | |
| 7,234,410 B2 | 6/2007 | Quigley et al. | |
| 7,243,716 B2 | 7/2007 | Denniel et al. | |
| 7,285,333 B2 | 10/2007 | Wideman et al. | |
| 7,306,006 B1 | 12/2007 | Cornell | |
| 7,498,509 B2 | 3/2009 | Brotzell et al. | |
| 7,523,765 B2 | 4/2009 | Quigley et al. | |
| 2001/0006712 A1 | 7/2001 | Hibino et al. | |
| 2002/0081083 A1 | 6/2002 | Griffioen et al. | |
| 2002/0094400 A1 | 7/2002 | Lindstrom et al. | |
| 2002/0119271 A1 | 8/2002 | Quigley et al. | |
| 2002/0185188 A1 | 12/2002 | Quigley et al. | |
| 2003/0008577 A1 | 1/2003 | Quigley et al. | |
| 2003/0087052 A1 | 5/2003 | Wideman et al. | |
| 2004/0025951 A1 | 2/2004 | Baron et al. | |
| 2004/0052997 A1 | 3/2004 | Santo | |
| 2004/0074551 A1 | 4/2004 | McIntyre | |
| 2004/0094299 A1 | 5/2004 | Jones | |
| 2004/0096614 A1 | 5/2004 | Quigley et al. | |
| 2004/0134662 A1 | 7/2004 | Chitwood et al. | |
| 2004/0226719 A1 | 11/2004 | Morgan et al. | |
| 2004/0265524 A1 | 12/2004 | Wideman et al. | |
| 2005/0087336 A1 | 4/2005 | Surjaatmadja et al. | |
| 2005/0189029 A1 | 9/2005 | Quigley et al. | |
| 2006/0000515 A1 | 1/2006 | Huffman | |
| 2006/0054235 A1 * | 3/2006 | Cohen et al. | 138/149 |
| 2006/0249508 A1 | 11/2006 | Teufl et al. | |
| 2007/0040910 A1 | 2/2007 | Kuwata | |
| 2007/0125439 A1 | 6/2007 | Quigley et al. | |
| 2007/0154269 A1 | 7/2007 | Quigley et al. | |
| 2007/0187103 A1 | 8/2007 | Crichlow | |
| 2008/0006337 A1 | 1/2008 | Quigley et al. | |
| 2008/0006338 A1 | 1/2008 | Wideman et al. | |
| 2008/0014812 A1 | 1/2008 | Quigley et al. | |
| 2008/0164036 A1 | 7/2008 | Bullen | |
| 2008/0185042 A1 | 8/2008 | Feechan et al. | |
| 2008/0210329 A1 | 9/2008 | Quigley et al. | |
| 2009/0107558 A1 | 4/2009 | Quigley et al. | |
| 2009/0194293 A1 | 8/2009 | Stephenson et al. | |
| 2009/0278348 A1 | 11/2009 | Brotzell et al. | |

(56) References Cited

U.S. PATENT DOCUMENTS

| | | |
|---|---|---|
| 2010/0101676 A1 | 4/2010 | Quigley et al. |
| 2010/0212769 A1 | 8/2010 | Quigley et al. |
| 2010/0218944 A1 | 9/2010 | Quigley et al. |
| 2011/0013669 A1 | 1/2011 | Raj et al. |

FOREIGN PATENT DOCUMENTS

| | | |
|---|---|---|
| DE | 1959738 | 6/1971 |
| DE | 3603597 | 8/1987 |
| DE | 4040400 A1 | 8/1992 |
| DE | 4214383 CI | 9/1993 |
| EP | 0024512 A1 | 3/1981 |
| EP | 0203887 A2 | 12/1986 |
| EP | 352148 | 1/1990 |
| EP | 0427306 A2 | 5/1991 |
| EP | 0477704 A1 | 4/1992 |
| EP | 0503737 A1 | 9/1992 |
| EP | 505815 | 9/1992 |
| EP | 0536844 A1 | 4/1993 |
| EP | 0681085 A2 | 11/1995 |
| EP | 0 854 029 A2 | 7/1998 |
| EP | 0 854 029 A3 | 4/1999 |
| EP | 0953724 A2 | 11/1999 |
| EP | 0970980 | 1/2000 |
| EP | 0981992 A1 | 3/2000 |
| FR | 989204 | 9/1951 |
| GB | 553110 | 8/1942 |
| GB | 809097 | 2/1959 |
| GB | 909187 | 10/1962 |
| GB | 956500 | 4/1964 |
| GB | 1297250 | 11/1972 |
| GB | 2103744 A | 2/1983 |
| GB | 2193006 | 1/1988 |
| GB | 2255994 A | 11/1992 |
| GB | 2255994 A | 11/1992 |
| GB | 2270099 A | 3/1994 |
| GB | 2 365 096 | 4/2000 |
| JP | 163 592 | 6/1990 |
| WO | WO 87/04768 | 8/1987 |
| WO | WO-9113925 | 9/1991 |
| WO | WO-9221908 | 12/1992 |
| WO | WO 93/07073 | 4/1993 |
| WO | 93/19927 | 10/1993 |
| WO | WO-9502782 A1 | 1/1995 |
| WO | WO-9512115 A2 | 4/1995 |
| WO | WO-9712166 A1 | 4/1997 |
| WO | WO-9919653 A1 | 4/1999 |
| WO | WO 00/31458 | 6/2000 |
| WO | WO 00/73695 A1 | 12/2000 |
| WO | WO-2006003208 A1 | 1/2006 |

OTHER PUBLICATIONS

Austigard E. and R. Tomter, "Composites Subsea: Cost Effective Products; an Industry Challenge," Subsea 94 International Conference, the 1994 Report on Subsea Engineering : The Continuing Challenges.

Connell Mike et al., "Coiled Tubing: Application for Today's Challenges," Petroleum Engineer International, pp. 18-21 (Jul. 1999).

Feechan Mike et al., "Spoolable Composites Show Promise," The American Oil & Gas Reporter, pp. 44-50 (Sep. 1999).

Fowler Hampton, "Advanced Composite Tubing Usable," The American Oil & Gas Reporter, pp. 76-81 (Sep. 1997).

Fowler Hampton et al., "Development Update and Applications of an Advanced Composite Spoolable Tubing," Offshore Technology Conference held in Houston Texas from May 4 to 7, 1998, pp. 157-162.

Hahn H. Thomas and Williams G. Jerry, "Compression Failure Mechanisms in Unidirectional Composites," NASA Technical Memorandum pp. 1-42 ( Aug. 1984 ).

Hansen et al., "Qualification and Verification of Spoolable High Pressure Composite Service Lines for the Asgard Field Development Project," paper presented at the 1997 Offshore Technology Conference held in Houston Texas from May 5 to 8, 1997, pp. 45-54.

Haug et al., "Dynamic Umbilical with Composite Tube (DUCT)," Paper presented at the 1998 Offshore Technology Conference held in Houston Texas from 4 to 7, 1998, pp. 699-712.

Lundberg et al., "Spin-off Technologies from Development of Continuous Composite Tubing Manufacturing Process," Paper presented at the 1998 Offshore Technology Conference held in Houston, Texas from May 4 to 7, 1998, pp. 149-155.

Marker et al., "Anaconda: Joint Development Project Leads to Digitally Controlled Composite Coiled Tubing Drilling System ," Paper presented at the SPEI/ COTA, Coiled Tubing Roundtable held in Houston, Texas from Apr. 5 to 6, 2000, pp. 1-9.

Measures R. M., "Smart Structures with Nerves of Glass." Prog. Aerospace Sci. 26(4): 289-351 (1989).

Measures et al., "Fiber Optic Sensors for Smart Structures," Optics and Lasers Engineering 16: 127-152 (1992).

Pope, Peter, "Braiding," International Encyclopedia of Composites, Published by VGH, Publishers, Inc. , New York, NY 10010, 1990.

Quigley et al., "Development and Application of a Novel Coiled Tubing String for Concentric Workover Services," Paper presented at the 1997 Offshore Technology Conference held in Houston, Texas from May 5 to 8, 1997, pp. 189-202.

Sas-Jaworsky II and Bell Steve, "Innovative Applications Stimulate Coiled Tubing Development," World Oil , 217(6): 61 (Jun. 1996).

Sas-Jaworsky IIand Mark Elliot Teel, "Coiled Tubing 1995 Update: Production Applications," World Oil, 216 (6): 97 (Jun. 1995 ).

Sas-Jaworsky, A. and J.G. Williams, "Advanced composites enhance coiled tubing capabilities," World Oil, pp. 57-69 (Apr. 1994).

Sas-Jaworsky, A. and J.G. Williams, "Development of a composite coiled tubing for oilfield services," Society of Petroleum Engineers, SPE 26536, pp. 1-11 (1993).

Sas-JaworsIcy, A. and J.G. Williams, "Enabling capabilities and potential applications of composite coiled tubing," Proceedings of World Oil's $2^{nd}$ International Conference on Coiled Tubing Technology, pp. 2-9 (1994).

Sas-Jaworsky II Alex, "Developments Position CT for Future Prominence," The American Oil & Gas Reporter, pp. 87-92 (Mar. 1996).

Tore Wood Moe et al., "Spoolable Composite Piping for Chemical and Water Injection and Hydraulic Valve Operation," Proceedings of the $11^{th}$ International Conference on Offshore Mechanics and Arctic Engineering-—1992-, vol. III, Part A—Materials Engineering, pp. 199-207 (1992).

Shuart J. M. et al., "Compression Behavior of #45°-Dominated Laminates with a Circular Hole or Impact Damage," AIAA Journal 24(1): 115-122 (Jan. 1986).

Silverman A. Seth, "Spoolable Composite Pipe for Offshore Applications," Materials Selection & Design, pp. 48-50 (Jan. 1997).

Rispler K. et al., "Composite Coiled Tubing in Harsh Completion/ Workover Environments," Paper presented at the SPE GAS Technology Symposium and Exhibition held in Calgary, Alberta, Canada, on Mar. 15-18, 1998, pp. 405-410.

Williams G. J. et al., "Composite Spoolable Pipe Development, Advancements, and Limitations," Paper presented at the 2000 Offshore Technology Conference held in Houston Texas from May 1 to 4, 2000, pp. 1-16.

European Search Report, Aug. 10, 2005.

International Search Report and Written Opinion for PCT/US2010/ 060582 mailed on Feb. 16, 2011 (11 pages).

International Search Report for PCT/US00/26977 mailed on Jan. 22, 2001, 3 pages.

International Search Report for PCT/US00/41073 mailed on Mar. 5, 2001, 3 pages.

International Search Report for PCT/US04/16093 mailed on Nov. 8, 2005, 9 pages.

Hartman, D.R., et al., "High Strength Glass Fibers," Owens Corning Technical Paper (Jul. 1996).

Sperling, L.H., "Introduction to Physical Polymer Science 3rd Edition," Wiley-Interscience, New York, NY, 2001, p. 100.

Fiberspar Tech Notes, "Horizontal well deliquification just got easier—with Fiberspar Spoolable Production Systems," TN21-R1UN1-HybridLift, 2010, 2 pages.

\* cited by examiner

COMPOSITE TUBING

CROSS-REFERENCE TO RELATED APPLICATIONS

The present application claims the benefit of U.S. Ser. No. 11/543,300 which claims the benefit of U.S. Ser. No. 10/134,971 which claims the benefit of U.S. Provisional Application No. 60/287,268 filed Apr. 27, 2001, U.S. Provisional Application No. 60/287,193 filed Apr. 27, 2001, U.S. Provisional Application No. 60/337,848 filed Nov. 5, 2001, and U.S. Provisional Application No. 60/337,025 filed Dec. 3, 2001. Each of the above-referenced patent applications is incorporated herein by reference.

BACKGROUND

Composite tubing is becoming an increasingly popular alternative to conventional steel tubing. Composite tubing provides improved mechanical properties, greater chemical and corrosion resistance, and longer service life than conventional steel tubing. As composite tubing is introduced into service in different operations, for example as line pipe, as down-hole well pipe, or as sub-sea pipe for the oil and gas industries, the composite tubing is faced with a range of environmental and working conditions, some of which may affect the performance of composite tubing. For example, composite tubing may be exposed to extreme temperatures and pressures, may be utilized to transport highly corrosive fluids and gases under high pressures, and may be subjected to high stresses and strains due to repeated spooling and un-spooling from a reel.

SUMMARY

The present disclosure is directed to embodiments of composite tubing having properties tailored to meet a wide variety of environmental and working conditions. The composite tubing disclosed herein may be continuous, corrosion and fatigue resistant, and lightweight, allowing the composite tubing to be repeatedly spooled and un-spooled on a reel and making the composite tubing particularly suited for use in the oil and gas industry to transport fluids or perform other operations traditionally carried out with steel tubing.

In accordance with one exemplary embodiment, a composite tube includes a substantially fluid impervious layer, a composite layer of fibers embedded in a matrix, and a thermal insulation layer for maintaining the temperature of fluid carried by the composite tube within a predetermined temperature range. The thermal insulation layer may be disposed at any point throughout the cross-section of the composite tube. For example, the thermal insulation layer can be disposed between the liner and the composite layer. The thermal insulation layer may extend along the entire length of the composite tube or may be disposed along one or more discrete lengths of the composite tube.

Materials for the thermal insulation layer are selected based on thermal properties sufficient to maintain the fluid within the desired temperature range and are further selected to withstand external forces that may be applied to the composite tube as a result of, for example, spooling, deployment, or external pressure. Suitable materials for the thermal insulation layer may include, for example, syntactic foams, foamed thermoset or thermoplastic materials such as epoxy, urethane, phenolic, vinylester, polyester, polypropylene, polyethylene, polyvinylchlorides, nylons, thermoplastic or thermoset materials filled with particles (such as glass, plastic, micro-spheres, ceramics), filled rubber, aerogels, or other elastic materials, or composites of these materials.

In accordance with another exemplary embodiment, a composite tube includes a substantially fluid impervious layer, a composite layer of fibers embedded in a matrix, and a crush resistant layer for increasing the hoop strength of the composite tube. The crush resistant layer may be disposed at any point throughout the cross-section of the composite tube and may extend along the entire length of the composite tube or may be disposed along one or more discrete lengths of the composite tube. The crush resistant layer may be bonded or unbonded to adjacent layers. The crush resistant layer may be a layer of thermoplastic, thermoset material, metal or other material having sufficient strength in the radial direction to increase the hoop strength of the composite tube and, thereby, provide increased crush or collapse resistance to the composite tube. The crush resistant layer may have a hoop strength greater than the hoop strength of the substantially fluid impervious layer and the hoop strength of the composite layer.

In one embodiment, the crush resistant layer may be layer of flexible corrugated tubing interposed, for example, between the composite layer and a pressure barrier layer external to the composite layer. The corrugated tubing may include a plurality of alternating parallel ridges and grooves. The corrugated tubing may be oriented such that the ridges and grooves are oriented at 0 degrees (i.e., parallel) to the longitudinal axis, at 90 degrees (i.e., perpendicular) to the longitudinal axis, or at any other angle (helical) relative to the longitudinal axis. In another embodiment, the crush resistant layer may be a plurality of discrete rings spaced along the length of the composite tube and interposed, for example, between the interior liner and the composite layer. In a further embodiment, the crush resistant layer may be a coiled spring interposed, for example, between the composite layer and a pressure barrier layer external to the composite layer.

In accordance with another exemplary embodiment, a composite tube includes an internal, fluid impervious liner, a composite layer of fibers embedded in a matrix surrounding and bonded to the internal liner and an external layer disposed exterior to the composite layer. The external layer may comprise at least one longitudinal section that is free to move longitudinally relative to the composite layer during bending of the composite tube. The external layer may be, for example, a wear resistant layer, a pressure barrier layer, another composite layer, a thermal insulation layer, a permeation barrier, or a buoyancy control layer. Bonding of the interior liner to the composite layer inhibits the separation of the layers during spooling or deployment due to shear forces on the composite tube. The interior layer may be chemically and/or mechanically bonded to the composite layer. In one embodiment, at least one longitudinal section of the external layer may be unbonded to the composite layer to permit the longitudinal section to move longitudinally relative to the composite layer during bending of the composite tube. The external layer is may be unbonded to the composite layer to reduce manufacturing costs for the composite tube as well as to increase the flexibility of the composite tube during spooling.

In accordance with another exemplary embodiment, a composite tube includes an internal liner and a composite layer of fibers embedded in a matrix surrounding at least a portion of the internal liner. The internal liner may include a substantially fluid impervious inner layer and a permeation barrier. The permeation barrier operates to inhibit the permeation of fluids, particularly gases under pressure, through the internal liner. For example, the permeation barrier may have a permeability of less than $1 \times 10^{-10}$ $(cm^3)$/cm per sec-$cm^2$- bar, preferably, less than $1\times10^{-12}$ $(cm^3)$/cm per sec-$cm^2$-bar. The permeation barrier may extend along the entire length of the composite tube or may be disposed along one or more discrete lengths of the composite tube.

The permeation barrier can be constructed from any metal, metal alloy, or combinations of metals suitable for use in composite tubing. For example, the metal or metals may be selected to withstand the external forces applied to the composite tube as a result of spooling, deployment, or external pressure and the internal forces applied to the composite tube from a pressurized fluid carried within the composite tube. In the case of a metal permeation barrier, the permeability of the metal layer forming the permeation barrier may be less than $1\times10^{-14}$ $(cm^3)$/cm per sec-$cm^2$-bar, and, preferably, is approximately zero (0). In addition, the metal or metals may be selected to have a melt temperature greater than the operational temperature of the composite tube. For example, composite tubing for use in the oil and gas industry may have an operational temperature of up to about 350° F.

Alternatively, the permeation barrier can be constructed from polymers, such as thermoplastics, thermosets, thermoplastic elastomers, metal-coated polymers, filled polymers, or composites thereof, having the desired permeability to inhibit fluid flow through the permeation barrier. In the case of filled polymers, fillers are added to the polymer to reduce the permeability of the polymer. Examples of such fillers include metallic fillers, clays, nano-clays, ceramic materials, fibers, silica, graphite, and gels.

In the case of a metallic permeation barrier, the metallic layer may be applied to the composite tube using a wide variety of processes, generally depending on the type of metal used and the intended operating conditions of the composite tube. For example, the metallic layer may be a metal foil that can be wrapped about the composite tube during manufacturing of the composite tube or co-formed with the inner layer of the interior liner. Alternatively, the metal foil may be applied to the composite tube using conventional coating processes such as, for example, plating, deposition, or powder coating. Alternatively, a metal foil laminated to a polymer film can be used as a permeation barrier, such as aluminum, steel, stainless steel or other alloys laminated to polyester, polypropylene, HDPE, or other polymer film. In addition, the permeation barrier may be a fusible metal having a low melt temperature that allows the metal to be applied in a liquid or semi-liquid state to the composite tube. Preferably, the fusible metal is selected to have a melt temperature less than the processing temperature of the composite tubing during manufacturing and greater than the intended operational temperature, of the composite tube. In one exemplary embodiment, the permeation barrier may be formed of the fusible metal indium or indium alloys. Exemplary indium alloys may include Ag, Pb, Sn, Bi, and/or Cd.

In certain exemplary embodiments, a composite tube may include an optional adhesive layer interposed between the inner layer and the permeation barrier to facilitate bonding of the inner layer and the permeation barrier. Materials for the adhesive layer may include any polymers or other materials suitable for bonding, chemically, mechanically and/or otherwise, to the permeation barrier and to the inner layer of the internal liner of the composite tube. Suitable materials may include, for example, contact type adhesives or liquid resin type adhesives, thermoplastics, thermosets, thermoplastic elastomers, metal-coated polymers, filled polymers, or combinations thereof. In the case of thermoplastics and thermoplastic elastomers, the adhesive layer material may have a melt temperature greater than the operational temperature of the composite tube and less than the manufacturing process temperature of the composite tube. In one exemplary embodiment, the adhesive layer comprises a layer of thermoplastic having a melt temperature of less than 350° F. In the case of thermoset materials, the adhesive layer material may have a curing temperature less than the manufacturing process temperature of the composite tube.

The composite tube may also include an optional second adhesive layer interposed between the permeation barrier and the composite layer to facilitate bonding of the composite layer to the permeation barrier. Materials for the second adhesive layer may include any polymers or other materials suitable for bonding, chemically, mechanically and/or otherwise, to the material forming the permeation barrier, e.g., metal, and to the matrix material of the composite layer of the composite tube. Suitable materials may include, for example, contact type adhesives or liquid resin type adhesives, thermoplastics, thermosets, thermoplastic elastomers, metal-coated polymers, filled polymers, or combinations thereof. In one embodiment, the material forming the second adhesive layer is chemically reactive with both the metal forming the permeation barrier and the matrix of the composite layer.

In other exemplary embodiments, the first adhesive layer and/or the second adhesive layer may be a composite of contact type adhesives or liquid resin type adhesives, thermoplastics, thermosets, thermoplastic elastomers, metal-coated polymers, and/or filled polymers.

In further exemplary embodiments, the internal liner may include multiple fluid impervious layers, multiple permeation barriers, and multiple adhesive layers. For example, one exemplary embodiment of a composite tube may include an internal liner having a substantially fluid impervious inner thermoplastic layer, a permeation barrier in the form of a metal foil layer, a first adhesive layer interposed between the inner layer and the permeation barrier, a second substantially fluid impervious layer external to the permeation barrier and a second adhesive layer interposed between the permeation barrier and the second substantially fluid impervious layer.

In accordance with another exemplary embodiment, a composite tube includes an internal liner and a composite layer of fibers embedded in a matrix surrounding at least a portion of the internal liner. The internal liner may include a substantially fluid impervious inner layer, a permeation barrier, and an optional adhesive layer interposed between the permeation barrier and the composite layer to facilitate bonding of the composite layer and the permeation barrier. The permeation barrier may operate to inhibit the permeation of fluids, particularly gases under pressure, through the internal liner. For example, the permeation barrier may have a permeability of less than $1\times10^{-10}$ $(cm^3)$/cm per sec-$cm^2$-bar, preferably, less than $1\times10^{-12}$ $(cm^3)$/cm per sec-$cm^2$-bar. The permeation barrier may extend along the entire length of the composite tube or may be disposed along one or more discrete lengths of the composite tube.

In accordance with a further exemplary embodiment, a composite tube includes an internal liner, a composite layer of fibers embedded in a matrix surrounding at least a portion of the internal liner, and a pressure barrier layer external to the composite layer. The pressure barrier layer may include a substantially fluid impervious inner layer and a permeation barrier. The permeation barrier operates to inhibit the permeation of fluids, particularly gases under pressure, through the pressure barrier layer. For example, the permeation barrier may have a permeability of less than $1\times10^{-10}$ $(cm^3)$/cm per sec-$cm^2$-bar, preferably, less than $1\times10^{-12}$ $(cm^3)$/cm per sec-$cm^2$-bar. The pressure barrier layer and the permeation barrier may extend along the entire length of the composite tube or may be disposed along one or more discrete lengths of the composite tube.

In certain exemplary embodiments, the pressure barrier layer of a composite tube may include an optional adhesive layer interposed between the inner layer and the permeation barrier to facilitate bonding of the inner layer and the permeation barrier. In other exemplary embodiments, the pressure barrier layer of a composite tube may include an optional adhesive layer interposed between the permeation barrier and another layer of the composite tube, such as an external wear resistant layer, to facilitate bonding of the permeation barrier to the additional layer. In further exemplary embodiments, the pressure barrier layer may include multiple fluid impervious layers, multiple permeation barriers, and multiple adhesive layers.

In other exemplary embodiments, the substantially fluid impervious layer of the internal liner, the substantially fluid impervious layer of the pressure barrier, and/or other layers of the composite tube may include one or more surface grooves oriented axially, i.e., generally parallel to the longitudinal axis of the composite tube, or oriented helically relative to the longitudinal axis of the composite tube. The grooves create axially or helically flow paths for fluids that may permeate into the layers of the composite tube. The flow paths formed by the grooves operate to increase the axial or helical permeability relative to the permeability through the cross-section of the composite tube. In the case of a composite tube having a generally circular cross-section, for example, the axial or helical permeability is greater than the radial permeability of the composite tube. Thus, fluid permeating through the wall of the composite tube can be vented from the composite tube through the grooves without becoming trapped within the wall of the composite tube.

In certain exemplary embodiments, a system for venting fluid from the grooves may also be provided. The system may include one or more vent paths through the layers of composite tube. For example, a vent path may be in fluid communication at one end with an axially or helically oriented groove on the interior liner and/or the pressure barrier layer and in fluid communication with the interior or the exterior of the composite tube at another end. In this manner, fluid within the grooves may be vented or otherwise discharged from within the wall of the composite tube via the vent path.

Alternatively, the system for venting fluid from the grooves may be a coupling, fitting, or other external structure attached to the composite tube. The coupling may include a vent path that is in fluid communication at one end with an axial or helically oriented groove within the internal liner or a pressure barrier layer and in fluid communication with the interior or exterior of composite tube at another end. The coupling may include a one-way check valve within the vent path to inhibit fluid flow into the grooves from the interior or exterior of the composite tube.

In other exemplary embodiments, the permeation barrier of the internal liner and/or the pressure barrier of the composite tube may include one or more holes that allow for the flow of fluid through the permeation barrier. For example, one or more holes may be provided at discrete locations along the length of composite tube to provide preferential venting of fluids across the permeation barrier.

In accordance with another exemplary embodiment, a composite tube includes an internal liner and a composite layer of fibers embedded in a matrix surrounding at least a portion of the internal liner. The composite tube may have high axial permeability relative to the permeability through the cross-section of the composite tube to allow for the axial transport of fluids that may permeate into the walls of the composite tube. For example, the axial permeability of the composite tube may be at least five times greater than the radial permeability of a composite tube having a circular cross section.

BRIEF DESCRIPTION OF THE DRAWINGS

These and other features and advantages of the composite tubes disclosed herein will be more fully understood by reference to the following detailed description in conjunction with the attached drawings in which like reference numerals refer to like elements through the different views. The drawings illustrate principles of the composite tubes disclosed herein and, although not to scale, show relative dimensions.

DETAILED DESCRIPTION OF EXEMPLARY EMBODIMENTS

Figure 1:
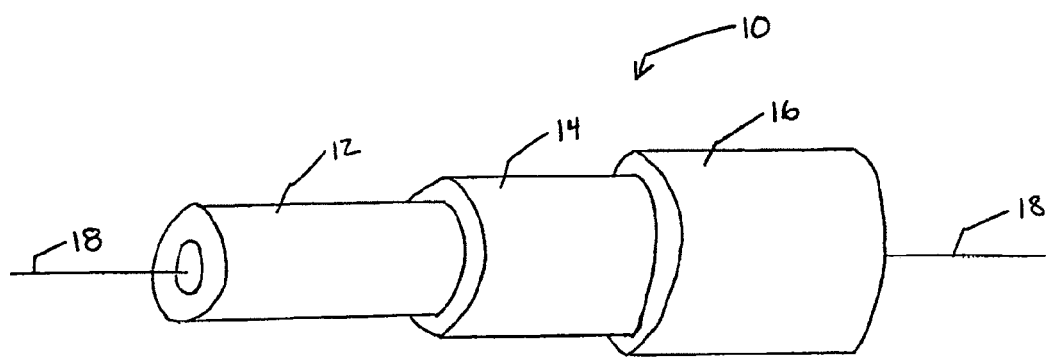
FIG. 1 is a perspective view, partially broken away, of an exemplary composite tube including an interior liner, a thermal insulation layer, and a composite layer.
Figure 2:
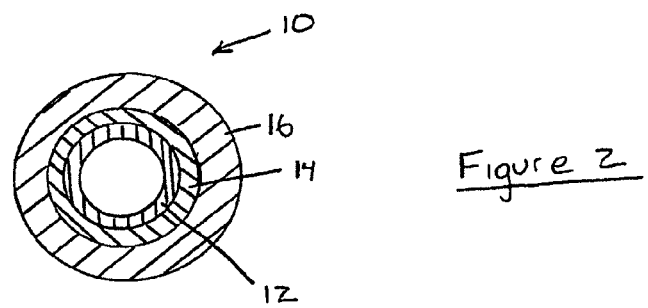
FIG. 2 is a side view in cross-section of the composite tube of FIG. 1.

Referring to FIGS. 1-2, an exemplary composite tube 10 constructed of an internal liner 12, a thermal insulation layer 14, and a composite layer 16 is illustrated. The composite tube 10 is generally formed along a longitudinal axis 18 and can have a variety of cross-sectional shapes, including circular, oval, rectangular, square, polygonal, and the like. The illustrated tube 10 has a circular cross-section. The composite tube 10 can generally be constructed in manner analogous to one or more of the composite tubes described in commonly owned U.S. Pat. Nos. 6,016,845, 5,921,285, 6,148,866, and U.S. Pat. No. 6,004,639 and U.S. Pat. No. 6,286,558. Each of the aforementioned patents is incorporated herein by reference.

The liner 12 may serves as a fluid containment layer and as a pressure barrier layer to resist leakage of internal fluids from the composite tube 10. In this regard, the liner 12 is preferably substantially fluid impervious to resist the leakage of internal fluid into additional layers of the composite tube 10. The liner 12 may be constructed from polymeric materials such as thermoplastics and thermoset polymers. Alternatively, the liner 12 may be constructed from elastomeric or metallic or a heat-shrinkable material. The liner 12 may also include fibers or additives to increase the load carrying strength of the liner and the overall load carrying strength of the composite tube.

In the case of a metal liner, the metals forming the liner 12 can include, individually or in combination, steel, titanium, lead, aluminum, copper, or stainless steel. In the case of a polymeric liner 12, the polymeric materials making up the liner 12 can be thermoplastic or thermoset materials. For instance, the liner 12 can be formed of homo-polymers, co-polymers, composite polymers, or co-extruded composite polymers. Homo-polymers refer to materials formed from a single polymer, co-polymers refers to materials formed by blending two or more polymers, and composite polymers refer to materials formed of two or more discrete polymer layers that have been permanently bonded or fused. The polymeric materials forming the interior liner are preferably selected from a group of various polymers, including but not limited to: polyvinylidene fluoride, etylene tetrafluoroethylene, cross-linked polyethylene ("PEX"), polyethylene, and polyester. Further exemplary thermoplastic polymers include materials such as polyphenylene sulfide, polyethersulfone, polyethylene terephthalate, polyamide, polypropylene, and acetyl.

The liner 12 can also include fibers to increase the load carrying strength of the liner and the overall load carrying strength of the composite tube 10. Exemplary composite fibers include graphite, glass, kevlar, fiberglass, boron, and polyester fibers, and aramid. The liner 12 may also be a nano-composite such as polypropylene filled with nano-clay.

The liner 12 may be resistive to corrosive chemicals such as heterocyclic amines, inorganic sulfur compound, and nitrogenous and acetylenic organic compounds. Three types of liner material, polyvinylidene fluoride ("PVDF"), etylene tetrafluoroethylene ("ETFE"), and polyethylene ("PE"), have been found to meet the severe chemical exposure characteristics demanded in particular applications involving composite coiled tubing. Two particularly attractive materials for the liner material are the RC10-089 grade of PVDF, manufactured by Atochem, and Tefzel® manufactured DuPont.

In other embodiments of liner 12, the liner comprises co-polymers formed to achieve enhanced characteristics, such as corrosion resistance, wear resistance and electrical resistance. For instance, a liner 12 can be formed of a polymer and an additive such that the liner has a high electrical resistance or such that the liner dissipates static charge buildup within the composite tube 10. In particular, carbon black can be added to a polymeric material to form a liner 12 having a resistivity on the order of $10^8$ ohms/centimeter. Accordingly, the carbon black additive forms a liner 12 having an increased electrical conductivity that provides a static discharge capability. The static discharge capability advantageously prevents the ignition of flammable fluids being circulated within the composite tube 10.

The polymeric materials forming the liner 12 can have an axial modulus of elasticity exceeding 100,000 psi. For applications in which the composite tube 10 may be subject to high internal pressure, the liner 12 may have a modulus exceeding 100,000 psi. In addition, a liner with an axial modulus of elasticity less than 500,000 psi advantageously allows the liner to bend, rather than pull away from the composite layer, as the composite tube is spooled or bent around a eel.

In certain exemplary embodiments, the liner 12 has a mechanical elongation of at least 25%. A liner with a mechanical elongation of at least 25% can withstand the increased bending and stretching strains placed upon the liner 12 as it is coiled onto a reel and inserted into and removed from various well bores. Accordingly, the mechanical elongation characteristics of the liner 12 may prolong the overall life of the composite tube 10. In the case of polymeric liners, particularly thermoplastic liners, the liner 12 preferably has a melt temperature of at least 250° Fahrenheit so that the liner is not altered or changed during the manufacturing process for forming the composite coiled tubing. A liner having these characteristics typically has a radial thickness in the range of 0.02-0.25 inches.

The composite layer 16 can be formed of one or more plies, each ply having one or more fibers disposed within a matrix, such as a polymer, resin, or thermoplastic. The fiber material and orientation can be selected to provide the desired mechanical characteristics for the composite layer 16 and the composite tube 10. In the illustrated embodiment, the composite layer 16 is disposed external to and is coextensive with the internal liner 12 and the thermal insulation layer 14. One skilled in the art will appreciate that other arrangements may be possible. For example, the liner 12 may be disposed external to the composite layer 16 to serve as a substantially fluid impervious layer and/or a pressure barrier layer and inhibit external fluids from leaking through the composite tube 10. Moreover, the composite layer 16 and the liner 12, as well as other layers of the composite tube, if present, need not be coextensive circumferentially or coextensive longitudinally. Additional composite layers or other internal or external layers beyond the composite layer 16, such as a wear resistant layer, a pressure barrier layer, or an other layer disclosed herein may also be provided to enhance the capabilities of the composite tube 10.

In certain exemplary embodiments, the matrix has a tensile modulus of at least 100,000 psi, preferably at least 250,000 psi, and has a maximum tensile elongation of at least 5%. In the case of a thermoset matrix, the matrix may have a glass transition temperature of at least 180° F. In the case of a thermoplastic matrix, the matrix may have a melt temperature of at least 250° F. The fibers may be structural fibers and/or flexible yarn components. The structural fibers may be formed of carbon, nylon, polyester, aramid, thermoplastic, glass, or other suitable fiber materials. The flexible yarn components, or braiding fibers, may be formed of nylon, polyester, aramid, thermoplastic, glass, or other suitable fiber materials. The fibers included in the composite layer 16 can be woven, braided, knitted, stitched, circumferentially wound, or helically wound. In particular, the fibers can be biaxially or triaxially braided. The composite layer 16 can be formed through pultrusion processes, braiding processes, or continuous filament winding processes. In certain exemplary embodiments, a tube formed of the liners and the composite layers disclosed herein may form a composite tube having a tensile strain of at least 0.25 percent and being capable of maintaining an open bore configuration while being spooled on a reel.

The liner 12, illustrated in FIG. 1, may also include grooves or channels on the exterior surface of the liner. In certain embodiments, the liner 12 may be bonded to the composite layer 16 or other layers of the composite tube, such as the thermal insulation layer 14. The grooves may increase the bonding strength between the liner 12 and other layers by supplying a roughened surface for the components of the other layers, e.g., fibers, the matrix material, or an adhesive, to bond to. For example, in embodiments in which the liner 12 is bonded to the composite layer 16, the grooves may further increase the bonding strength between the liner 12 and the composite layer 16 if the grooves are filled with a matrix. The matrix may acts as an adhesive, causing the composite layer to be securely adhered to the underlying liner 12. Preferably, the grooves are helically oriented on the liner relative to the longitudinal axis 17.

The composite tube 10 may optionally include one or more energy conductors within the composite tube. In addition, sensors optionally may be provided within the composite tube 10 to monitor the condition of the tube and/or conditions of the fluid transported by the composite tube 10.

The thermal insulation layer 14 in the exemplary composite tube is disposed between the liner 12 and the composite layer 16 and is provided within the composite tube 10 to maintain the temperature of fluid carried by the composite tube 10 within a predetermined temperature range. Although the exemplary embodiment illustrates the thermal insulation layer 14 disposed between the liner 12 and the composite layer 16, the thermal insulation layer 14 may be disposed at any point throughout the cross-section of the composite tube 10. For example, the thermal insulation layer may be disposed interior to the liner 12, exterior to the composite layer 16, or between the composite layer 16 and additional layer(s), including a wear protection layer, of the composite tube 10. In one embodiment, for example, the thermal insulation layer 14 may be disposed between the composite layer and an outer wear resistant layer. The thermal insulation layer 14 may extend along the entire length of the composite tube 10 or may be disposed along one or more discrete lengths of the composite tube 10. In this manner, the entire composite tube 10 may be insulated or selected segments of the composite tube 10 may be separately insulated. Additionally, the thermal properties of the thermal insulation layer 14 may be varied along the length of the composite tube 10 by, for example, varying the material selected or the radial thickness of the thermal insulation layer 14. In this manner, selected lengths of the composite tube 10 may provide greater thermal insulation to the transported fluid than other lengths of the composite tube 10.

Materials for the thermal insulation layer 14 are selected based on the thermal properties required to maintain the fluid within the desired temperature range. Additional consideration may be given to the ability of the material selected to withstand external forces that may be applied to the composite tube as a result of, for example, spooling, deployment, or external pressure. Suitable materials for the thermal insulation layer may include for example, syntactic foams, foamed thermoset or thermoplastic materials such as epoxy, urethane, phenolic, vinylester, polypropylene, polyethylene, polyvinylchlorides, nylons, thermoplastic or thermoset materials filled with particles (such as glass, plastic, micro-spheres, ceramics), filled rubber, aerogels, or other elastic materials, or Composites of these materials.

Figure 3A:
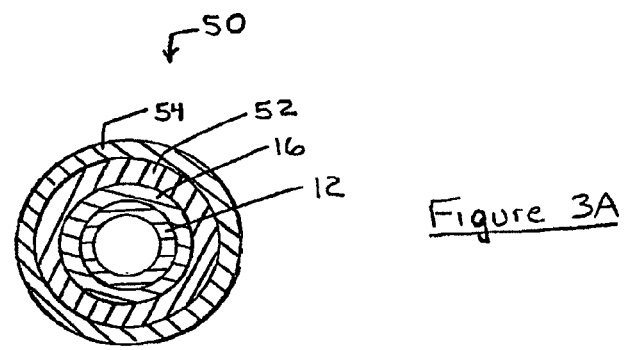
FIG. 3A is a side view in cross-section of another exemplary embodiment of a composite tube including a crush resistant layer disposed between the composite layer and an exterior layer.

FIG. 3A illustrates another exemplary embodiment of a composite tube. The composite tube 50 may include an internal, fluid impervious liner 12, a composite layer 16 of fibers embedded in a matrix surrounding the internal liner 12, and a crush resistant layer 52 surrounding the composite layer 16 for increasing the hoop strength of the composite tube 50. The composite tube 50 may also include an optional pressure barrier layer 54. In certain embodiments, the crush resistant layer may have a hoop strength greater than the hoops strength of one or more of the other layers of the composite tube, including, for example, the interior liner 12 and the composite layer 16.

Figure 3B:
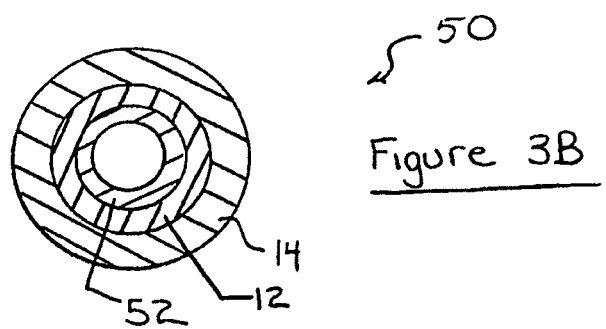
FIG. 3B is a side view in cross-section of another exemplary embodiment of a composite tube including a crush resistant layer disposed between the interior liner and the composite layer.

Although the crush resistant layer 52 is illustrated as being disposed between the composite layer 16 and the pressure barrier layer 54, the crush resistant layer 52 may be disposed at any point throughout the cross-section of the composite tube 50. For example, the crush resistant layer may be disposed interior to the liner 12 (FIG. 3B), exterior to the composite layer 16, or between the composite layer 16 and additional layer(s) of the composite tube 10. The crush resistant layer 52 may extend along the entire length of the composite tube 52 or may be disposed along one or more discrete lengths of the composite tube. In this manner, increased crush resistance may be provided to the entire length of the composite tube 50 or to selective longitudinal segments of the Composite tube 50. In addition, the amount of crush resistance, e.g. hoop strength, provided by the crush resistant layer 52 may be varied along the length of the composite tube 52 by, for example, varying the material used for the crush resistant layer 52, the make-up or structure of the crush resistant layer 52, and/or the radial thickness of the crush resistant layer 52. In this manner, selective longitudinal segments of the composite tube 52 can have increased crush resistance compared to other segments of the composite tube 50.

The crush resistant layer 52 may be constructed from a thermoplastic, thermoset material, metal, fiber reinforced composite material, interlocking metal, corrugated metal, or other material having sufficient strength in the radial direction to increase the hoop strength of the composite tube and, thereby, provide increased crush or collapse resistance to the composite tube 52. In certain exemplary embodiments, the crush resistant layer may be a continuous layer of axially interlocking rings in which each ring may connected to an axially adjacent ring. A layer of interlocking rings may provide increased hoop strength and increased flexibility, as the layer may bend or flex at the junction of adjacent rings. The interlocking rings may be constructed of metal, such as steel or stainless steel, polymers, fiber reinforced composites, or composite/metal hybrids. The rings within a layer may be constructed of the same or different materials.

Figure 4A:
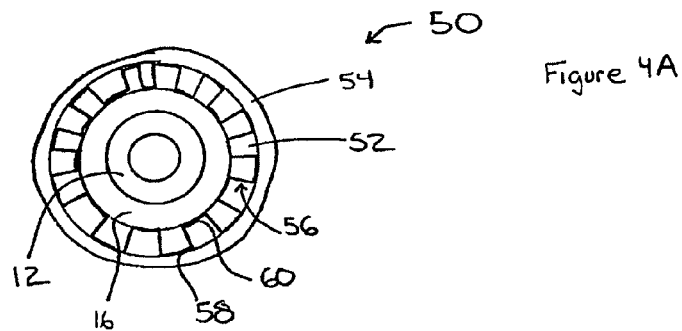
FIG. 4A is a side view in cross-section of another exemplary embodiment of a composite tube including a crush resistant layer formed from a corrugated tube.
Figure 4B:
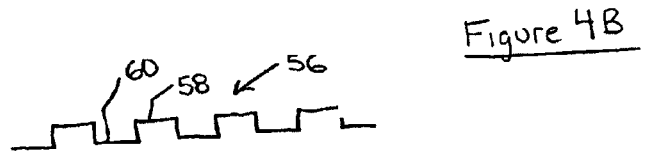
FIG. 4B is an elongated cross-sectional view of the corrugated tube of FIG. 4A.

In one embodiment illustrated in FIGS. 4A 4B, the crush resistant layer 52 may be a layer of flexible corrugated tubing 56 interposed, for example, between the composite layer 16 and the pressure barrier layer 54 external to the composite layer. The corrugated tubing 56 may include a plurality of alternating parallel ridges 58 and grooves 60. The corrugated tubing 56 may be oriented such that the ridges 58 and grooves 60 are oriented at 0 degrees (i.e., parallel) to the longitudinal axis, at 90 degrees (i.e., perpendicularly) to the longitudinal axis, or at any other angle (i.e. helically) relative to the longitudinal axis.

Figure 5:
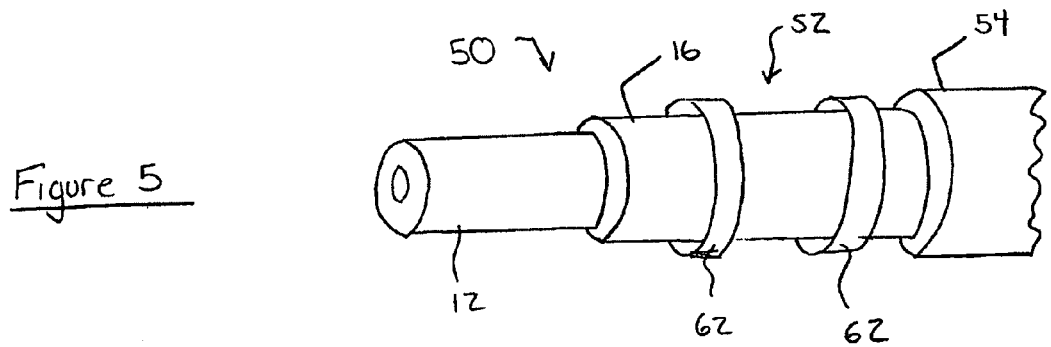
FIG. 5 is a perspective view, partially broken away, of another exemplary embodiment of a composite tube including a crush resistant layer formed by a plurality of spaced-apart rings.

In another embodiment illustrated in FIG. 5, the crush resistant layer 52 may be a plurality of discrete rings 62 spaced along the length of the composite tube 50 and interposed, for example, between the composite layer 16 and the pressure barrier layer 54. The rings 62 may be oriented circumferentially as illustrated or, alternatively, the rings 62 may be oriented helically, i.e., at an angle to the longitudinal axis of the composite tube.

Figure 6A:
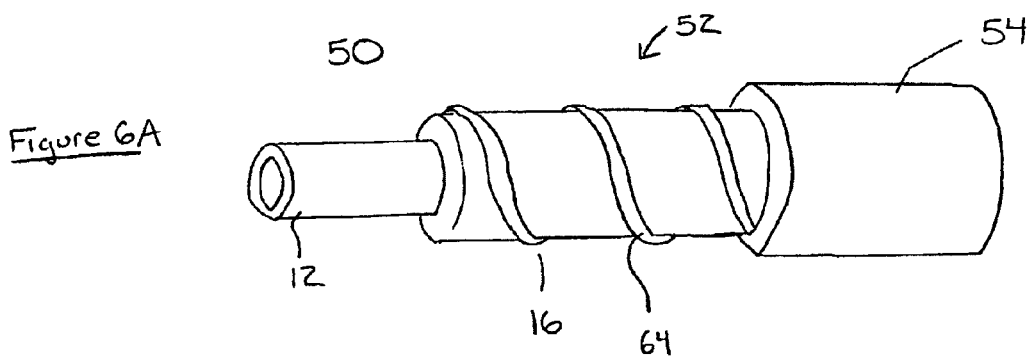
FIG. 6A is a perspective view, partially broken away, of another exemplary embodiment of a composite tube including a crush resistant layer formed by a coiled spring.
Figure 6B:
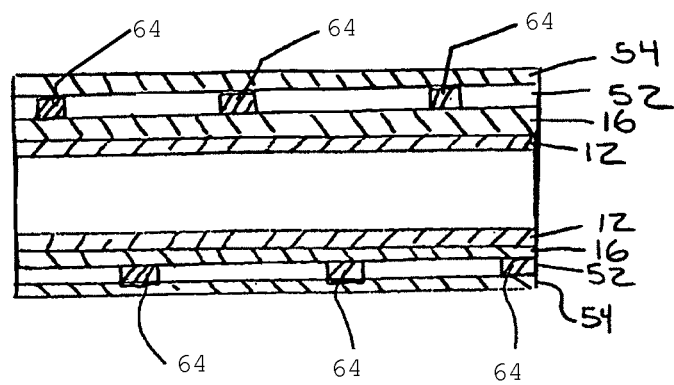
FIG. 6B is a cross-sectional view of the composite tube of FIG. 6A.

In a further embodiment illustrated in FIGS. 6A and 6B, the crush resistant layer 52 may be a coiled spring 64 interposed, for example, between the composite layer 16 and the pressure barrier layer 54. In the illustrated embodiment, the spring 64 is oriented coaxially with the longitudinal axis of the composite tube. The spring 64 preferably has a rectilinear cross-section, as best illustrated in FIG. 6B to facilitate incorporation of the spring between the composite layer 16 and the pressure barrier layer 54. One skilled in the art will appreciate that the cross-section of the spring may be other shapes without departing from the scope of the present disclosure.

Figure 7:
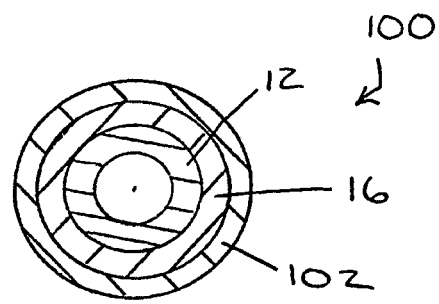
FIG. 7 is a side view in cross-section of another exemplary embodiment of a composite tube including an un-bonded external layer.

In accordance with another exemplary embodiment illustrated in FIG. 7, a composite tube 100 includes an internal, fluid impervious liner 12, a composite layer 16 of fibers embedded in a matrix surrounding and bonded to the internal liner 12 and an external layer 102 that is free to move longitudinally relative to other layers of the composite tube. In the illustrated embodiment, for example, the external layer 102 is free to move longitudinally relative to the adjacent composite layer 16. The external layer 102 may be, for example, a wear resistant layer, a pressure barrier layer, or any other layer described herein.

As discussed above, the layers of the composite tubes disclosed herein may be optionally bonded to one another. For example, the liner 12 may be optionally bonded to the composite layer 16. Bonding of the liner 12 to the composite layer 16 inhibits the separation of the layers during spooling or deployment due to shear forces on the composite tube 100. The liner 12 may be, for example, chemically and/or mechanically bonded to the composite layer 16.

In the illustrated embodiment of FIG. 7, the external layer 102 is unbonded to the adjacent composite layer 16 thereby permitting the external layer 102 to move longitudinally relative to the adjacent composite layer 16. By not bonding the external layer or other layer to an adjacent layer, manufacturing costs for the composite tube 100 may be reduced and the flexibility of the composite tube 100 during bending, for example during spooling, may be increased. An unbonded external layer 102 may also be more readily repaired or replaced in the event of wear than an integrally bonded external layer. In certain exemplary embodiments, one or more discrete lengths of the external layer, or other layers, may be unbonded to one or both adjacent layers, if the external layer has an adjacent layer on both sides. Alternatively, the entire length of the external layer, or other layers may be unbonded to one or both adjacent layers, if the external layer has an adjacent layer on both sides.

Additional exterior layers, for example additional composite layers, wear resistant layers or pressure barrier layers may be provided external to the exterior layer 102. The additional layers may be bonded to the respective adjacent interior layer or may be unbonded depending the particular application of the composite tube 100.

Figure 8:
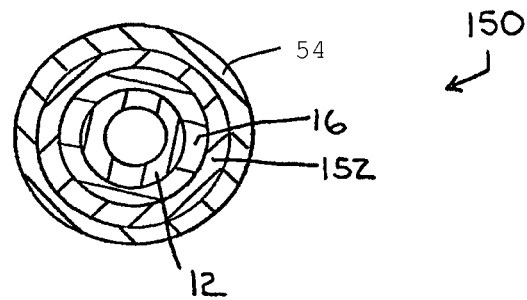
FIG. 8 is a side view in cross-section of another exemplary embodiment of a composite tube including a layer of low density material.

FIG. 8 illustrates a further exemplary embodiment of composite tube 150 that includes an internal, fluid impervious liner 12, a composite layer 16 of fibers embedded in a matrix surrounding the internal liner 12, and a layer 152 of low density material incorporated within the composite tube to provide buoyancy to at least a longitudinal segment of the composite tube 150. An optional pressure barrier layer 54, as well as other additional layers including additional layers 152 of low density material and additional composite layers, may be provided external to the layer 152 of low density material. Although the layer 152 is illustrated as being disposed between the composite layer 16 and the pressure barrier layer 54, the layer 152 of low density material may be disposed at any point throughout the cross-section of the composite tube 150 including, for example, between the inner liner 12 and the composite layer 16. The layer 152 of low density material may extend along the entire length of the composite tube 150 or may be disposed along one or more discrete lengths of the composite tube 150. The layer 152 of low density material allows selected longitudinal segments or the entire length of the composite tube to have positive or neutral buoyancy.

Preferably, the low density material for the layer 152 is selected to have a specific gravity of less than or equal to 1. Suitable low density materials may include, for example, syntactic foams, foamed thermoset or thermoplastic materials such as epoxy, urethane, phenolic, vinylester, polypropylene, polyethylene, polyvinylchlorides, nylons, thermoplastic or thermoset materials filled with particles (such as glass, plastic, micro-spheres, ceramics), filled rubber or other elastic materials, or composites of these materials.

In a further alternative embodiment, a layer of high density material may be incorporated into a composite tube to selectively weight segments or the entire length of the composite tube and thereby selectively provide negative buoyancy to the composite tube. Preferably, the high density material selected has a specific gravity greater than 1.25 and preferably greater than 2.0. The layer of high density material may be incorporated into the composite tube in a manner analogous to the layer 152 of low density material described above. Moreover, a composite tube may include segments of low density material and segments of high density material.

Figure 9:
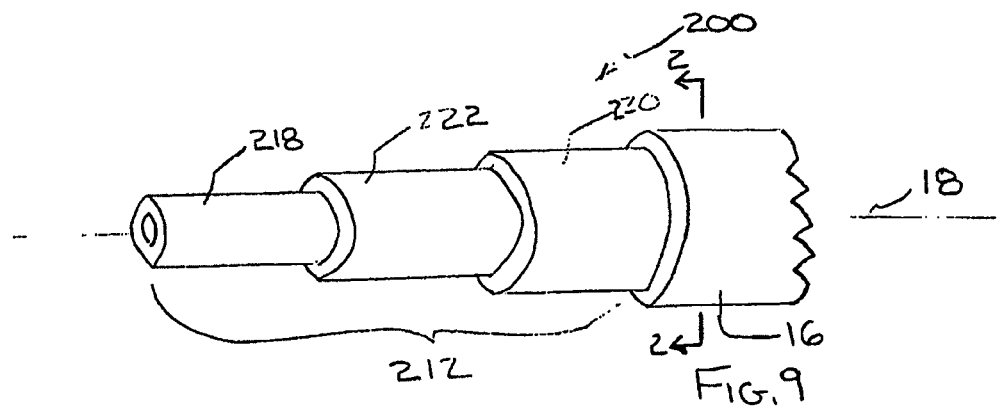
FIG. 9 is a perspective view, partially broken away, of an exemplary composite tube including a composite layer and an interior liner having an inner layer, a permeation barrier, and an optional adhesive layer interposed between the inner layer and the permeation barrier.
Figure 10:
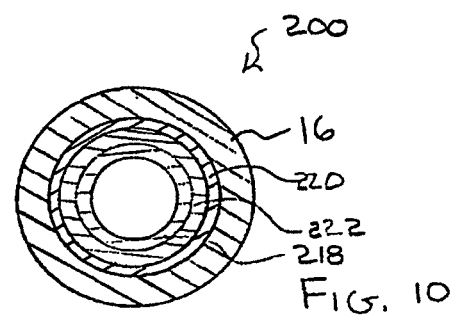
FIG. 10 is a side view in cross-section of the composite tube of FIG. 9.

Referring to FIGS. 9 and 10, an exemplary composite tube 200 constructed of an interior liner 212 and a composite layer 18 is illustrated. The liner 212 serves as a fluid containment and permeation barrier to resist permeation of internal fluids from the composite tube 200. In the exemplary embodiment illustrated in FIGS. 9 and 10, the liner 212 includes a fluid impervious inner layer 218, a permeation barrier 220, and an optional adhesive layer 222 interposed between the inner layer 218 and the permeation barrier 220. The inner layer 218 is may be constructed in a manner analogous to the interior liner described above. For example, the inner layer 218 may be constructed from polymeric materials such as thermoplastics and thermoset polymers, and may also be constructed from elastomeric or metallic or a heat-shrinkable material. The inner layer 218 may also include fibers or additives to increase the load carrying strength of the liner and the overall load carrying strength of the composite tube.

The permeation barrier 220 may be constructed from any metal or combinations of metals suitable for use in composite tubing and having a permeability sufficient to inhibit the permeation of fluid through the permeation barrier. For example, the metal selected for the permeation barrier 220 may have a permeability of less than $1\times10^{-10}$ $(cm^3)$/cm per sec-$cm^2$-bar, preferably, less than $1\times10^{-12}$ $(cm^3)$/cm per sec-$cm^2$-bar. In addition, the metal or metals may be selected to withstand the external forces applied to the composite tube 10 as a result of spooling, deployment, or external pressure, as well as the internal forces applied to the composite tube 200 from a pressurized fluid carried within the composite tube. In addition, the metal or metals may be selected to have a melt temperature greater than the operational temperature of the composite tube 200. For example, composite tubing for use in the oil and gas industry may have an operational temperature of up to approximately 350° F. A metal layer forming the permeation barrier may have a permeability of less than $1\times10^{-14}$ $(cm^3)$/cm per sec-$cm^2$-bar, and, preferably, approximately zero (0).

Alternatively, the permeation barrier 220 can be constructed from polymers, such as thermoplastics, thermosets, thermoplastic elastomers, nano-composites, metal coated polymers or composites thereof, having the desired permeability to inhibit fluid permeation through the permeation barrier, as well as the desired structural properties.

In the case of a metallic permeation barrier 220, the metallic layer forming the permeation barrier may be applied to the composite tube 200 using a wide variety of processes, generally depending on the type of metal used and the intended operating conditions of the composite tube. For example, the metallic layer may be a metal foil that can be wrapped about the composite tube 200 during manufacturing of the composite tube or co-formed with the inner layer of the interior liner. Alternatively, the metal forming the permeation barrier may be applied to the composite tube 200 using conventional coating processes such as, for example, plating, deposition, or powder coating. In addition, the permeation barrier may be a fusible metal having a low melt temperature that allows the metal to be applied in a liquid or semi-liquid state to the composite tube and also allows the metal to form a seal with the layer the metal is applied to prevent permeation. Preferably, the fusible metal is selected to have a melt temperature less than the processing temperature of the composite tubing during manufacturing and greater than the intended operational temperature of the composite tube. Indium or Indium alloys, for example, may be a suitable fusible metal for use in the metallic layer.

Although the exemplary embodiment illustrates the permeation barrier 220 disposed within the liner 212 of the composite tube 200, the permeation barrier 220, as well as one or more optional adhesive layers, if necessary, may be disposed at any point throughout the cross-section of the composite tube 200. For example, the permeation barrier 220 may be disposed interior to the liner 212, exterior to the composite layer 16, between the composite layer 16 and additional layer(s) of the composite tube 200, or between additional layers of the composite tube. In addition, alternative embodiments of the composite tube may include a plurality of permeation barriers positioned throughout the cross-section of the composite tube. The permeation barrier 220 may extend along the entire length of the composite tube 200 or may be disposed along one or more discrete lengths of the composite tube 200. In this manner, the entire composite tube 200 may include one or more permeation barriers or selected segments of the composite tube 200 may include one or more permeation barriers. Additionally, the permeability of the permeation barrier 220 may be varied along the length of the composite tube 200 by, for example, varying the material selected, the radial thickness or the density of the permeation barrier 220. In this manner, selected lengths of the composite tube 200 may have greater permeability than other lengths of the composite tube 200.

The optional adhesive layer 222 may be provided to facilitate bonding between the fluid impervious layer 218 and the permeation barrier 220. Materials for the optional adhesive layer 222 may include any polymers or other materials suitable for bonding, chemically, mechanically and/or otherwise, to the material forming the permeation barrier, e.g., metal, and to the material forming the inner layer 218 of the internal liner 212 of the composite tube 200. Suitable materials for the adhesive layer 222 may include, for example, contact type adhesives or liquid resin type adhesives, thermoplastics, thermosets, thermoplastic elastomers, or combinations thereof. In the case of thermoplastics and thermoplastic elastomers, the adhesive layer material may have a melt temperature greater than the operational temperature of the composite tube and less than the manufacturing process temperature of the composite tube. In one exemplary embodiment, the adhesive layer comprises a layer of thermoplastic having a melt temperature of less than 300° F. In the case of thermoset materials, the adhesive layer material may have a curing temperature less than the manufacturing process temperature of the composite tube.

The optional adhesive layer 222 may be applied to the inner layer 218, added during the manufacturing process for the composite tube 200, or may be applied to the permeation barrier 220. The adhesive layer 222 may extend along the entire length of the permeation barrier 220 or the inner layer 218 or may be disposed along one or more discrete lengths between the permeation barrier 220 or the inner layer 218. In this manner, the entire length of the permeation barrier 220 and the inner layer 218 may be bonded together or, alternatively, selected segments of the permeation barrier 220 and the inner layer 218 may be bonded. Additionally, the bonding or adhesive properties of the adhesive layer 222 may be varied along the length of the permeation barrier 220 or the inner layer 218. In this manner, selected lengths of the permeation barrier 220 and the inner layer 218 may have greater bond strength than other lengths of the composite tube 200.

The adhesive layer 222 is optional. In certain exemplary embodiments, an adhesive layer between the inner layer 218 and the permeation barrier 220 may not be necessary or desired. For example, the material of the inner layer 218 may be selected to bond with the material of the permeation barrier 220, eliminating the need for a separate adhesive layer. In other exemplary embodiments, the permeation barrier 220 may not be bonded to the inner layer 218 or the permeation barrier 220 may be mechanically bonded to the inner layer 218 by the compression force exerted on the permeation barrier by the layers external to the permeation barrier 220.

Figure 11:
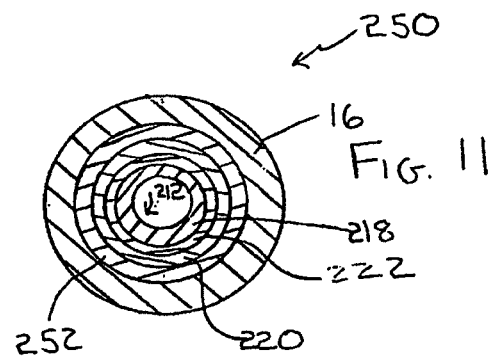
FIG. 11 is a side view in cross-section of another exemplary embodiment of a composite tube including an optional second adhesive layer disposed between the composite layer and the permeation barrier.

FIG. 11 illustrates another exemplary embodiment of a composite tube. The composite tube 250 may include an interior liner 212 and a composite layer 16. In the exemplary embodiment illustrated in FIG. 11, the interior liner 212 includes a fluid impervious inner layer 218, a permeation barrier 220, an optional first adhesive layer 222 interposed between the inner layer 218 and the permeation barrier 220, and an optional second adhesive layer 252 interposed between the permeation barrier 220 and the composite layer 16. The optional second adhesive layer 252 is provided to facilitate bonding of the composite layer 16 to the permeation barrier 220. Materials for the second adhesive layer 252 may include any polymers or other materials suitable for facilitating bonding, chemically, mechanically and/or otherwise, to the material forming the permeation barrier 222, e.g., metal, and to the matrix material of the composite layer 214 of the composite tube 250. Suitable materials may include, for example, contact type adhesives or liquid resin type adhesives, thermoplastics, thermosets, thermoplastic elastomers, or combinations thereof. In one exemplary embodiment, the material forming the second adhesive layer 252 is chemically reactive with both the metal forming the permeation barrier 252 and the matrix of the composite layer 16. In the case of thermoplastics and thermoplastic elastomers, the material forming the second adhesive layer 252 may have a melt temperature greater than the operational temperature of the composite tube and less than the manufacturing process temperature of the composite tube. In one exemplary embodiment, the second adhesive layer comprises a layer of thermoplastic having a melt temperature of less than 200° F. In the case of thermoset materials, the material forming the second adhesive layer 252 may have a curing temperature less than the manufacturing process temperature of the composite tube.

The optional second adhesive layer 252 may be applied to the permeation barrier 220 or otherwise added during the manufacturing process for the composite tube 250. The second adhesive layer 252 may extend along the entire length of the permeation barrier 220 or composite layer 16 or may be disposed along one or more discrete lengths between the permeation barrier 220 or composite layer 16. In this manner, the entire length of the permeation barrier 220 and the composite layer 16 may be bonded together or, alternatively, selected segments of the permeation barrier 220 and the composite layer 16 may be bonded. Additionally, the bonding or adhesive properties of the second adhesive layer 252 may be varied along the length of the permeation barrier 220 or the composite layer 16. In this manner, selected lengths of the permeation barrier 220 and the composite layer 16 may have greater bond strength than other lengths of the composite tube 250.

Figure 12:
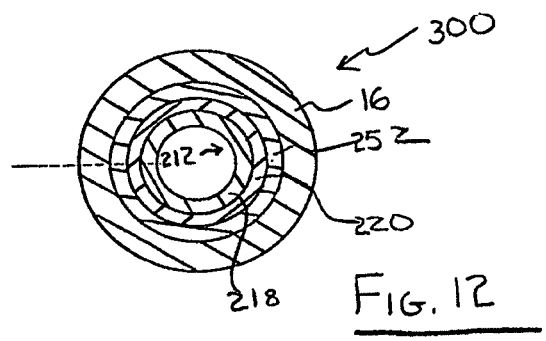
FIG. 12 is a side view in cross-section of another exemplary embodiment of a composite tube including a composite layer and an interior liner having an inner layer, a permeation barrier, and an optional adhesive layer interposed the composite layer and the permeation barrier.

FIG. 12 illustrates a further exemplary embodiment of a composite tube 300. The composite tube 300 may include an interior liner 212 and a composite layer 16. In the exemplary embodiment illustrated in FIG. 12, the interior liner 212 includes a fluid impervious inner layer 218, a permeation barrier 220, and an optional adhesive layer 252 interposed between the permeation barrier 220 and the composite layer 16. The optional adhesive layer 252 is provided to facilitate bonding of the composite layer 16 to the permeation barrier 220 and may be constructed in a manner analogous to the second adhesive layer 252 described above in connection with the exemplary embodiment of FIG. 11.

Figure 13:
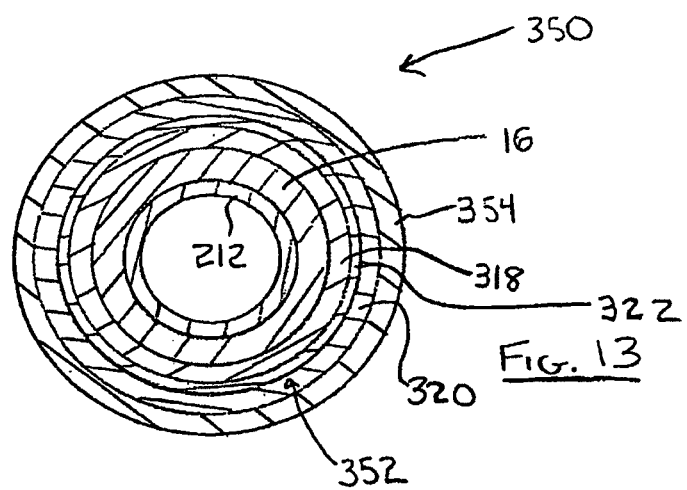
FIG. 13 is a side elevational view in cross-section of another exemplary embodiment of a composite tube including an interior liner, a composite layer, and a pressure barrier having an inner layer; a permeation barrier, and an optional adhesive layer interposed between the inner layer and the permeation barrier.

FIG. 13 illustrates a further exemplary embodiment of a composite tube 350. The composite tube 350 may include an interior liner 212, a composite layer 16, a pressure barrier layer 352 exterior to the composite layer 16, and an exterior wear resistant layer 354. In the exemplary embodiment illustrated in FIG. 13, the interior liner 212 may include a fluid impervious inner layer 218, a permeation barrier 220, and an optional adhesive layer 222 interposed between the permeation barrier 220 and the inner layer 218, as described above in connection with the exemplary embodiment of FIGS. 9 and 10. The interior liner 212 may also include an optional second adhesive layer 257, as described in connection with the embodiment of FIG. 11. Alternatively, the interior liner 212 may include only the substantially fluid impervious inner layer 218, as in the case of the exemplary embodiment of FIGS. 1 and 2 described above.

In the exemplary embodiment of FIG. 13, the pressure barrier 352 includes a fluid impervious inner layer 318, a permeation barrier 320, and an optional adhesive layer 322 interposed between the permeation barrier 320 and the inner layer 318. The adhesive layer 322 may optionally be provided to facilitate bonding of the inner layer 318 to the permeation barrier 320. The materials, structure and function of the inner layer 318, the permeation barrier 320, and the adhesive layer 322 is analogous to that of the inner layer 218, the permeation barrier 220, and the adhesive layer 222 of the interior liner 212, described above in connection with the exemplary embodiment of FIGS. 9 and 10. Like the adhesive layer 222, the adhesive layer 322 is optional. In certain exemplary embodiments, the adhesive layer 322 may not be necessary or desired. The pressure barrier 352 may also include an optional second adhesive layer to facilitate bonding of the permeation barrier 320 to the external wear resistant layer 354.

Figure 14:
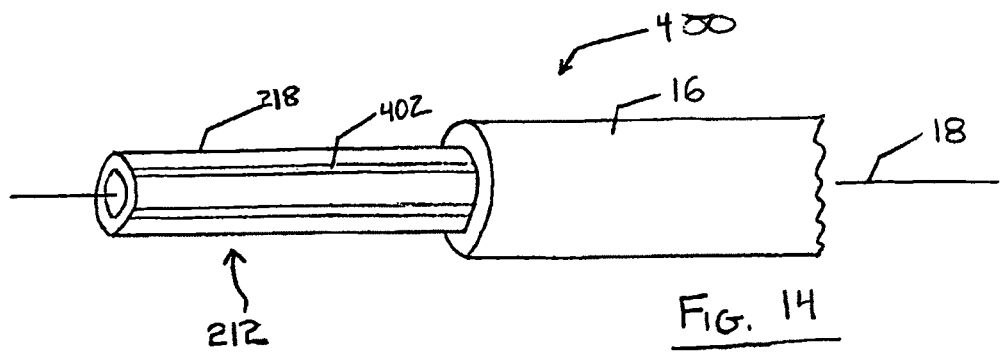
FIG. 14 is a perspective view, partially broken away, of an exemplary composite tube including a composite layer and an interior liner, illustrating axial grooves formed on the inner layer of the interior liner.

FIG. 14 illustrates an additional exemplary embodiment of a composite tube. The composite tube 400 may include an interior liner 212 and a composite layer 16. In the exemplary embodiment illustrated in FIG. 14, the interior liner 212 includes a fluid impervious inner layer 218. The interior liner 212 may also optionally include a permeation barrier and an optional adhesive layer. The substantially fluid impervious inner layer 218 of the internal liner 212 may include a plurality of axially oriented, relative to the longitudinal axis 18 of the composite tube 400, surface grooves 402. The grooves 402 create axially flow paths for fluids that may permeate into the inner layer 218 of the composite tube 400. The flow paths formed by the grooves 402 operate to increase the axial permeability relative to the cross-sectional, e.g., radial, permeability of the composite tube 400. For example, the axial permeability of the composite tube 400 may be at least five times greater than the radial permeability of the composite tube 400. The axial grooves 402 may be in fluid communication with a venting system, described below, or may communicate directly with the interior or exterior of the composite tube 400. Thus, fluid permeating through the inner layer 218 from the interior of the composite tube 400 can be vented from the composite tube 400 through the grooves 402 without becoming trapped within the wall of the composite tube 400.

Figure 15:
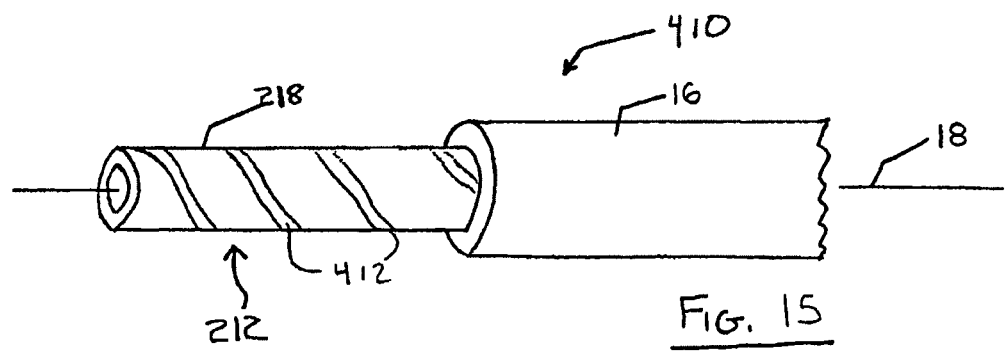
FIG. 15 is a perspective view, partially broken away, of an exemplary composite tube including a composite layer and an interior liner, illustrating helical grooves formed on the inner layer of the interior liner.

FIG. 15 illustrates another exemplary embodiment of a composite tube that is similar in construction to the exemplary embodiment illustrated in FIG. 14. In the exemplary embodiment of FIG. 15, the substantially fluid impervious inner layer 218 of the internal liner 212 may include a plurality of helically oriented, relative to the longitudinal axis 18 of the composite tube 410, surface grooves 412. Similar to the axially grooves 402 described above in connection with FIG. 14, the helical grooves 412 create helical flow paths for fluids that may permeate into the inner layer 218 of the composite tube 410. The flow paths formed by the grooves 412 operate to increase the axial permeability relative to the cross-sectional, e.g., radial, permeability of the composite tube 410. For example, the axial permeability of the composite tube 410 may be at least five times greater than the radial permeability of the composite tube 410.

Figure 16:
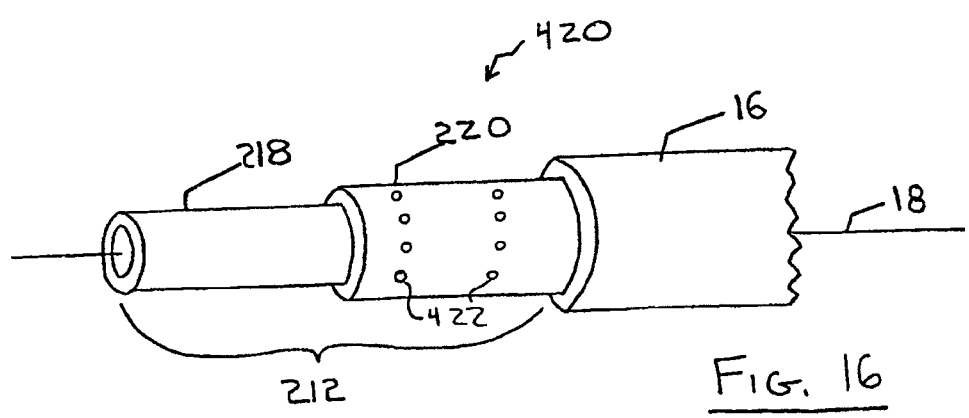
FIG. 16 is a perspective view, partially broken away, of an exemplary composite tube including a composite layer and an interior liner having an inner layer and a permeation barrier, illustrating vent holes formed in the permeation barrier of the interior liner.

FIG. 16 illustrates an additional exemplary embodiment of a composite tube. The composite tube 420 may include an interior liner 212 and a composite layer 14. In the exemplary embodiment illustrated in FIG. 16, the interior liner 212 includes a fluid impervious inner layer 218 and a permeation barrier 220. The permeation barrier 220 may include may include one or more holes 222 that allow for the flow of fluid through the permeation barrier 220. For example, one or more holes 222 may be provided at discrete locations along the length of composite tube 220 to provide preferential venting of fluids across the permeation barrier 220. The number and arrangement of the holes 222 may be varied depending on the permeability desired proximate the holes 222.

One skilled in the art will appreciate the axial grooves 402, the helical grooves 412, and the holes 422 may be provided on additional layers of the composite tube in other exemplary embodiments, including any of the layers disclosed herein. For example, axial or helical grooves may be provided on the fluid impervious layer of one or more pressures barriers within the composite tube. Also, the axial or helical grooves may be provided on layers other than fluid impervious layers, like, for example, on a composite layer of the composite tube.

Figure 17:
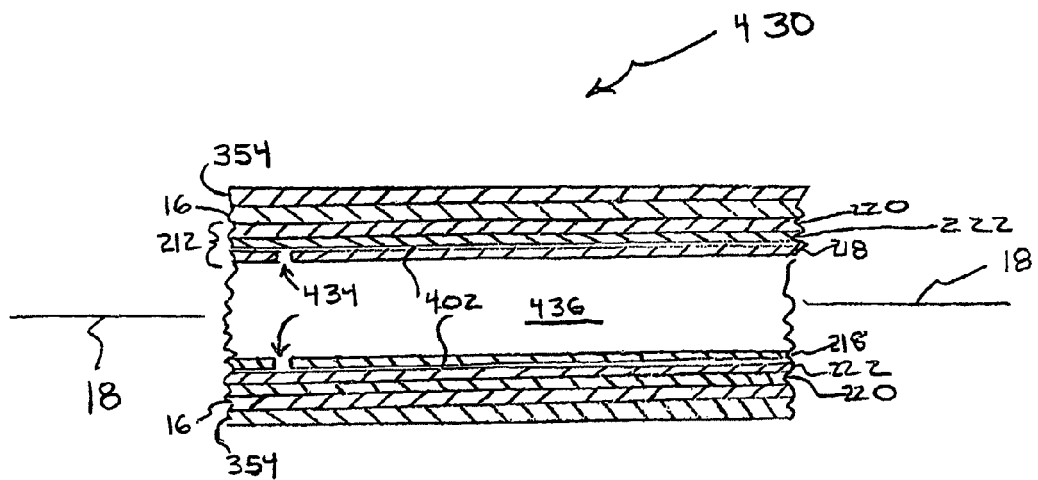
FIG. 17 is a longitudinal cross-section of an exemplary composite tube including a composite layer and an interior liner having an inner layer, a permeation barrier, and an optional adhesive layer interposed between the inner layer and the permeation barrier, illustrating axial grooves formed on the inner layer of the interior liner and vent paths providing communication between the axial grooves and the interior of the composite tube.

FIG. 17 illustrates an additional exemplary embodiment of a composite tube. The composite tube 430 may include an interior liner 212, a composite layer 16, and a wear resistant layer 354. In the exemplary embodiment illustrated in FIG. 17, the interior liner 212 includes a fluid impervious inner layer 218, a permeation barrier 220, and an optional first adhesive layer 222 interposed between the inner layer 218 and the permeation barrier 220. The substantially fluid impervious inner layer 218 of the internal liner 212 may include a plurality of axially oriented, relative to the longitudinal axis 18 of the composite tube 430, surface grooves 402. The composite tube 430 may include a system for venting fluid from the grooves 402. In the present exemplary embodiment, the venting system may include one or more vent paths 434 through the inner layer 218 of composite tube 430. Each vent path 434 may be in fluid communication at one end with an axial groove 402 and in fluid communication with the interior 436 of the composite tube 430 at another end. In this manner, fluid within the axial grooves 402 may be vented or otherwise discharged from within the wall of the composite tube, in this example, within the inner layer 218, of the composite tube 430, via the vent paths 434.

The vent paths 434 may be provided at any location throughout the cross-section of the composite tube and may be associated with one or more axial, helical or other grooves provided within the composite tube. Moreover, the vent paths 434 may positioned to be in fluid communication with the exterior of the composite tube, as well as the interior of the composite tube as illustrated in FIG. 17 and described above.

Figure 18:
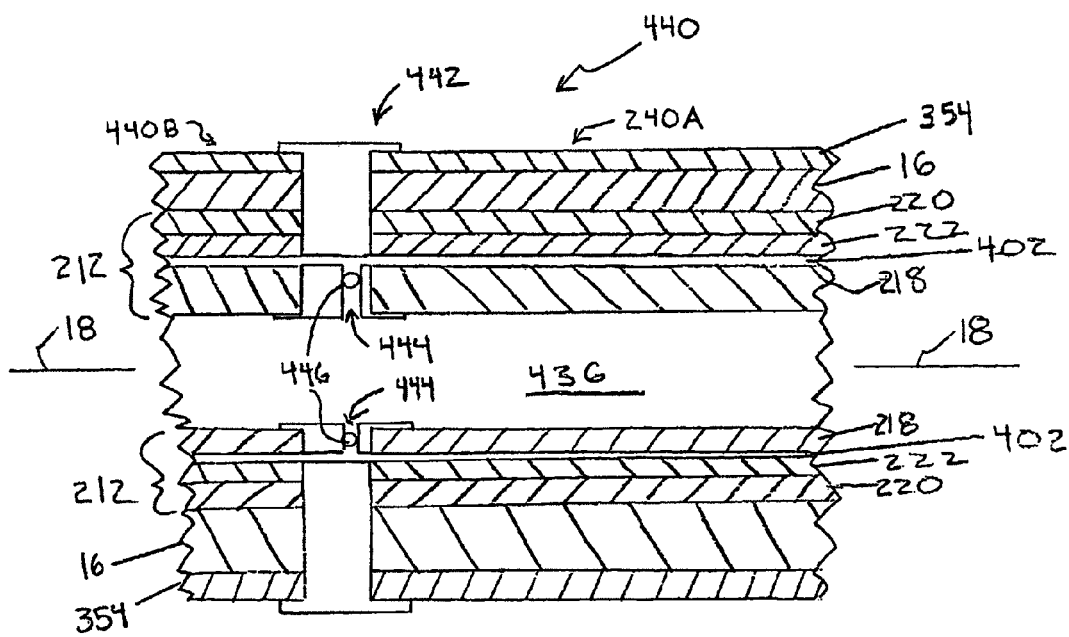
FIG. 18 is a longitudinal cross section of an exemplary composite tube including a composite layer and an interior liner having an inner layer, a permeation barrier, and an optional adhesive layer interposed between the inner layer and the permeation barrier, illustrating axial grooves formed on the inner layer of the interior liner and an external coupling having vent paths providing communication between the axial grooves and the interior of the composite tube.

FIG. 18 illustrates an additional exemplary embodiment of a composite tube. The composite tube 440 may include an interior liner 212, a composite layer 16, and a wear resistant layer 354. In the exemplary embodiment illustrated in FIG. 18, the interior liner 212 includes a fluid impervious inner layer 218, a permeation barrier 220, and an optional first adhesive layer 222 interposed between the inner layer 218 and the permeation barrier 220. The substantially fluid impervious inner layer 218 of the internal liner 212 may include a plurality of axially oriented, relative to the longitudinal axis 16 of the composite tube 440, surface grooves 402. The composite tube 440 may include a system for venting fluid from the grooves 402. In the present exemplary embodiment, an annular coupling 442 attached to the composite tube 440 provides the venting system. The coupling 442 may include one or more vent paths 444 that are each in fluid communication at one end with an axial oriented groove 402 within the inner layer 218 and in fluid communication with the interior 436 of the composite tube 440 at another end. A one-way check valve 446 may be provided within each vent path 444 to inhibit fluid flow into the grooves 402 from the interior 436 of the composite tube 440. In an alternative embodiment, a single vent path 444 may be provided within the coupling 442 to provide fluid communication between all the grooves 402 and the interior of the composite tube 440.

In the exemplary embodiment illustrated in FIG. 18, the coupling 442 is a pipe-to-pipe connector that connects two sections of the composite tube, sections 440A and 440B, together. In other exemplary embodiments, the coupling 442 may be an end connector for connecting an end of the composite tube 440 to external equipment.

The exemplary embodiments of composite tubes disclosed herein describe multiple layers that may be used within a composite pipe. The layers disclosed herein may be used in any of the described exemplary embodiments or may be arranged to create additional exemplary embodiments.

While the composite tubes disclosed herein have been particularly shown and described with references to exemplary embodiments thereof, it will be understood by those skilled in the art that various changes in form and details may be made therein without departing from the spirit and scope of the disclosure. Those skilled in the art will recognize or be able to ascertain using no more than routine experimentation, many equivalents to the exemplary embodiments described specifically herein. Such equivalents are intended to be encompassed in the scope of the present disclosure.

The invention claimed is:

1. A composite tube comprising:
   a substantially fluid impervious layer, wherein the substantially fluid impervious layer comprises a surface having grooves formed thereon to facilitate a bond between the substantially fluid impervious layer and at least one other layer of the composite tube, wherein the bond is adapted to restrict longitudinal movement between the substantially fluid impervious layer and the at least one other layer;
   a composite layer of fibers embedded in a first matrix, wherein the composite layer is formed of a first set of fibers embedded in the matrix and at least 80%, by fiber volume, of the fibers of the first set of fibers are helically oriented relative to a longitudinal axis of the composite tube at an angle of between ±30° and ±70°, and
   a thermal insulation layer formed at least partially of a material different from the first matrix selected to maintain a fluid carried within the composite tube within a predetermined temperature range, wherein the thermal insulation layer is formed at least partially of a foamed thermoset material or a foamed thermoplastic material.

2. The composite tube of claim 1, wherein the thermal insulation layer is disposed external to the composite layer.

3. The composite tube of claim 1, wherein the thermal insulation layer extends continuously along a complete length of the composite tube.

4. The composite tube of claim 1, wherein at least one of the foamed thermoset material and the foamed thermoplastic material is at least one of epoxy, urethane, phenolic, vinylester, polypropylene, polyethylene, polyvinylchloride, and nylon.

5. The composite tube of claim 1, wherein the first matrix is formed at least partially of a thermoplastic material having a tensile modulus of elasticity of at least 250,000 psi, a maximum tensile elongation of greater than or equal to 5%, and a melt temperature of at least 250° F.

6. The composite tube of claim 1, wherein the first matrix is formed at least partially of a thermoset material having a tensile modulus of elasticity of at least 250,000 psi, a maximum tensile elongation of greater than or equal to 5%, and a glass transition temperature of at least 180° F.

7. The composite tube of claim 1, wherein the substantially fluid impervious layer is formed at least partially of a thermoplastic polymer having a mechanical elongation of at least 25% and a melt temperature of at least 250° F.

8. The composite tube of claim 1, wherein the substantially fluid impervious layer is formed at least partially of a metallic material.

9. The composite tube of claim 1, wherein the bond comprises at least one of a chemical bond and a mechanical bond.

10. The composite tube of claim 1, wherein at least one of the composite layer and the thermal insulation layer is bonded to the substantially fluid impervious layer.

11. The composite tube of claim 1 further comprising a second matrix disposed within the grooves.

12. The composite tube of claim 1, wherein the grooves are helically oriented relative to a longitudinal axis of the composite tube.

13. The composite tube of claim 1 further comprising an external layer surrounding the substantially fluid impervious layer, the composite layer, and the thermal insulation layer, wherein the external layer is unbonded to and free to move longitudinally relative to the substantially fluid impervious layer, the composite layer, and the thermal insulation layer.

14. The composite tube of claim 1, wherein the external layer comprises at least one of a wear resistant layer, a pressure barrier layer, and an additional composite layer.

15. The composite tube of claim 1, wherein the thermal insulation layer is disposed between the composite layer and the substantially fluid impervious layer.

* * * * *